MUSIC RECORDING DEVICE

Filed Feb. 10, 1950 10 Sheets-Sheet 1

INVENTORS.
EUGEN BUHLER
EDWARD J. CLARK
BY Robert S. Dunham
ATTORNEY.

INVENTORS.
EUGEN BUHLER
EDWARD J. CLARK
BY Robert S. Dunham
ATTORNEY.

INVENTORS.
EUGEN BUHLER
EDWARD J. CLARK
BY Robert S. Dunham
ATTORNEY.

INVENTORS.
EUGEN BUHLER
EDWARD J. CLARK
BY Robert S. Dunham
ATTORNEY

Oct. 11, 1955 E. BUHLER ET AL 2,720,134

MUSIC RECORDING DEVICE

Filed Feb. 10, 1950 10 Sheets-Sheet 5

INVENTORS.
EUGEN BUHLER
EDWARD J. CLARK
BY Robert S. Dunham
ATTORNEY.

Oct. 11, 1955 | E. BUHLER ET AL | 2,720,134

MUSIC RECORDING DEVICE

Filed Feb. 10, 1950 | 10 Sheets-Sheet 6

INVENTORS.
EUGEN BUHLER
EDWARD J. CLARK
BY Robert S. Dunham

ATTORNEY.

Oct. 11, 1955 E. BUHLER ET AL 2,720,134

MUSIC RECORDING DEVICE

Filed Feb. 10, 1950 10 Sheets-Sheet 7

INVENTORS.
EUGEN BUHLER
EDWARD J. CLARK

BY Robert S. Dunham

ATTORNEY.

Oct. 11, 1955 E. BUHLER ET AL 2,720,134

MUSIC RECORDING DEVICE

Filed Feb. 10, 1950 10 Sheets-Sheet 8

INVENTORS.
EUGEN BUHLER
EDWARD J. CLARK

BY Robert S. Dunham

ATTORNEY.

Oct. 11, 1955 E. BUHLER ET AL 2,720,134

MUSIC RECORDING DEVICE

Filed Feb. 10, 1950 10 Sheets-Sheet 9

INVENTORS.
EUGEN BUHLER
EDWARD J. CLARK

BY Robert S. Dunham

ATTORNEY.

Oct. 11, 1955 E. BUHLER ET AL 2,720,134

MUSIC RECORDING DEVICE

Filed Feb. 10, 1950 10 Sheets-Sheet 10

INVENTORS.
EUGEN BUHLER
EDWARD J. CLARK
BY Robert S. Dunham
ATTORNEY.

United States Patent Office 2,720,134 Patented Oct. 11, 1955

2,720,134

MUSIC RECORDING DEVICE

Eugen Buhler, Poughkeepsie, N. Y., and Edward J. Clark, Norristown, Pa., assignors to International Business Machines Corporation, New York, N. Y., a corporation of New York Application February 10, 1950, Serial No. 143,402

15 Claims. (Cl. 84—451)

This invention relates to music recording devices and particularly to a device for providing a permanent printed record of a musical composition played on a musical instrument having a keyboard.

The present invention is intended to be an aid to composers, orchestrators, arrangers, and others engaged in similar pursuits in the musical field. In all of the above fields of endeavor, and particularly in the field of composing, it has been the general practice to play a chord or other note grouping and then stop and manually record the note values together with suitable tempo and time signature annotations. The present invention is intended to obviate the conventional intermittent methods of composing and to permit the composer, or other person engaged in similar pursuits, to devote his entire energies to composing instead of dividing his energies between composing and the recording of the composition.

The invention may be briefly described as an improved musical composition writing apparatus for automatically providing a complete permanent printed record, on a strip of score paper, of a msuical composition as it is played. Integrally combined in the invention are an improved assembly for advancing the score paper past a printing station including means by which the rate of advance of the score paper past the printing station may be varied in accordance with the tempo of the composition to be played; a time signature printing assembly for automatically printing measure and beat indicia on the advancing score paper in accordance with the time signature of the composition to be played, including means for providing a visual indication of the measure and beat of the composition as it is being recorded; and an improved printing assembly for printing the musical note indicia on the score paper in response to the period of depression of the keys of the musical instrument.

An object of this invention is to provide an improved musical composition writing apparatus.

Another object of this invention is to provide an improved musical composition writing apparatus having an improved score paper drive assembly.

Another object of this invention is to provide a score paper drive assembly for a musical composition writing apparatus in which the rate of advance of the score paper may be varied in accordance with the tempo of the composition to be played.

Another object of this invention is to provide an improved musical composition writing apparatus which provides a printed record of the measure and beat indicia of the composition to be played in accordance with the time signature of said composition.

Another object of this invention is to provide an improved musical composition apparatus including a time signature printing assembly for printing measure and beat indicia on the advancing score paper independent of the tempo of the composition to be played.

Another object of this invention is to provide an improved printing assembly for musical composition recording apparatus.

Another object of this invention is to provide a musical composition recording apparatus for printing musical note indicia in response to the period of depression of the keys on the musical instrument.

Another object of this invention is to provide a musical composition writing apparatus including means for visually presenting measure and beat indicia in accordance with the time signature of the composition to be played.

Referring to the drawings.

For the purposes of simplicity and clarity of explanation, the presently preferred embodiment of the invention, as illustrated in the above enumerated drawings, may be considered as being made up of the following basic components: (1) a score paper drive assembly for advancing score paper past a printing station including means by which the rate of advance of the score paper past the printing station may be varied in accordance with the tempo of the composition to be played; (2) a printing assembly positioned at the printing station for printing musical note indicia on said score paper in response to the period of depression of the keys of a musical instrument; and (3) a time signature printing assembly for printing measure and beat indicia on the advancing score paper in accordance with the time signature of the composition to be played.

(1) SCORE PAPER DRIVE ASSEMBLY

(a) *General*

Figure 1:
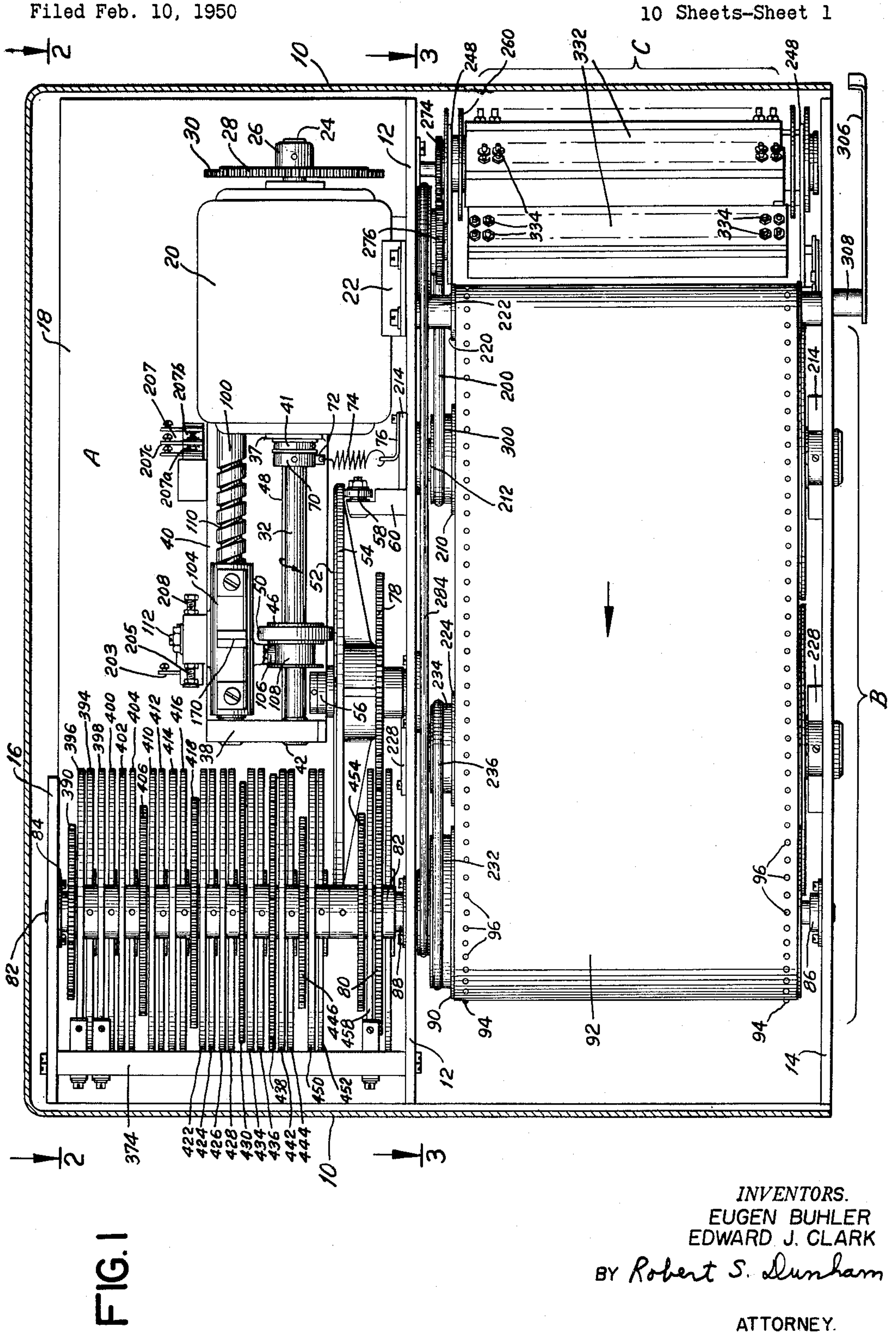
Fig. 1 is a front elevation of the presently preferred embodiment of the invention.

Referring to Fig. 1, the components of the score paper drive assembly are a drive unit designated generally as A, including means by which the rate of advance of the score paper past the printing station may be varied in accordance with the tempo of the composition to be played, a score paper advancing unit driven by the drive unit and designated generally as B, for advancing the score paper past the printing assembly, generally designated as C, and a carbon paper drive assembly, generally located in the area defined by C on Fig. 1. The above named components of the score paper drive assembly will now be examined in detail in the order set forth above.

(b) *Drive unit*

The drive unit for the score paper drive assembly, generally designated A on Fig. 1, includes the following components; a motor, a main drive shaft geared to and rotated by the periphery of a wheel slidably mounted on the main drive shaft, an associated mechanism for varying the speed of the driving disc by moving the wheel longitudinally along the main drive shaft so as to change the radial distance between the center of the driving disc and the point of engagement thereon with said wheel, and a rewind mechanism for effecting the rewinding of the score paper after use. The presently preferred embodiments of the above elements, as illustrated in the drawings, will now be described in detail.

Figure 2:
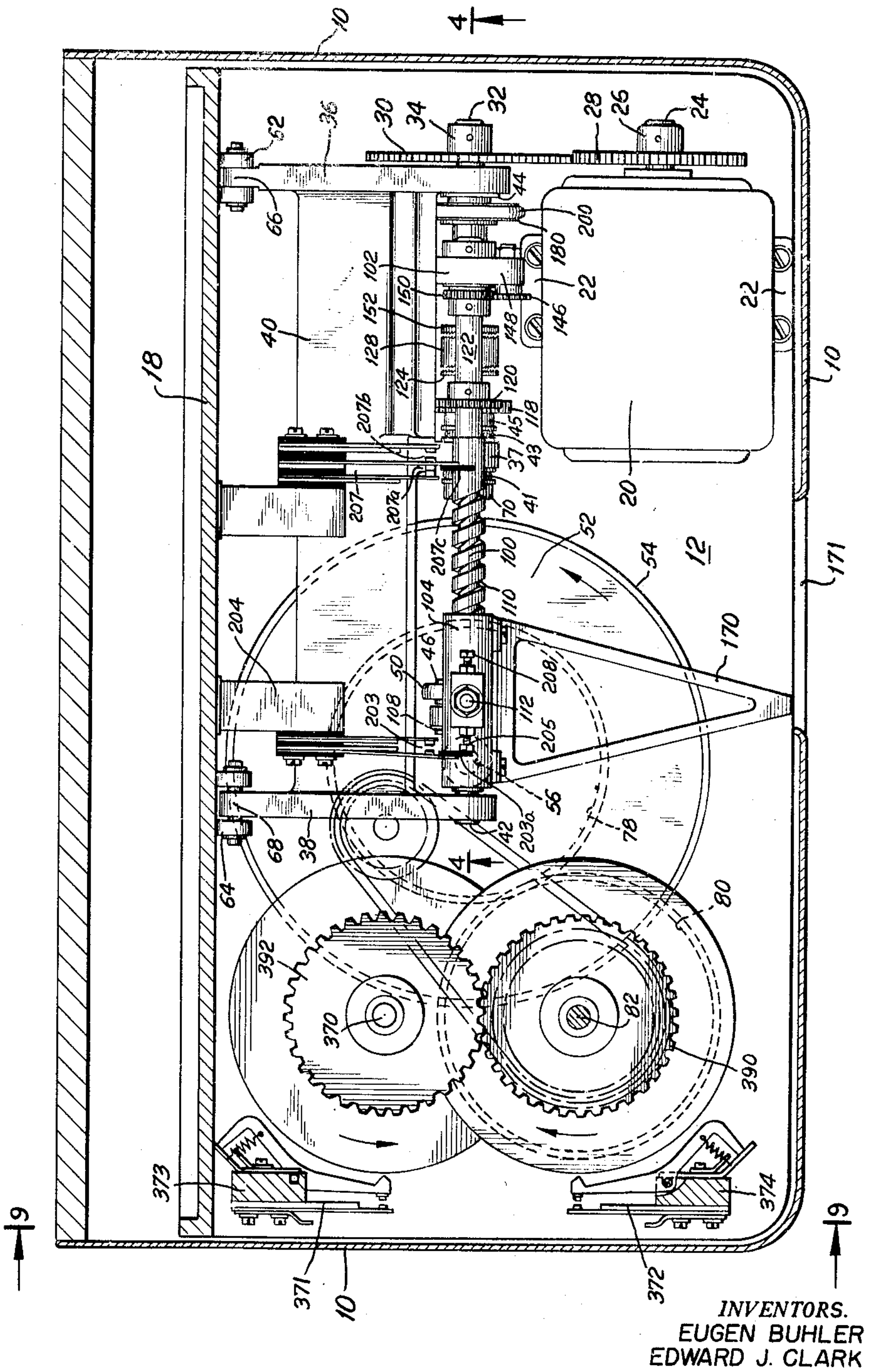
Fig. 2 is a plan view on line 2—2 of Fig. 1.

Referring now to Figs. 1 and 2, there is provided an external housing 10 enclosing the complete device and providing a mounting for the main internal supporting elements. The housing 10 may be suitably formed of wood or metal and may have a suitable shape and surface finish for providing a decorative effect. The components of the music recording device are mounted, in the main, within the external housing 10 on the main internal supporting elements which include an intermediate horizontal platform 12, a lower horizontal platform 14 and an upper horizontal platform 16. The horizontal platforms 12, 14 and 16, are positioned substantially parallel to each other and are secured to and supported partially by a vertical supporting member 18 (see Fig. 2) of suitable strength and construction to provide a relatively rigid support for the horizontal platforms 12, 14, and 16 and the components of the music recording device mounted thereon.

The details of the structure of the drive unit are illustrated in Figs. 1, 2, 4, 5, 6, 7 and 8. Mounted on the intermediate horizontal platform 12 is the main source of mechanical power for the music recording device. This source of mechanical power, in the presently preferred embodiment of the invention as illustrated in the drawings, is an electric motor 20 mounted on a suitable pedestal 22 secured to the upper surface of the intermediate horizontal platform 12. The motor 20 is preferably of the type that provides a substantially constant speed output. Mounted on the shaft 24 of the motor 20 and held in position thereon by a collar 26 is a gear 28. The gear 28 meshes with and drives a companion gear 30 mounted on the main drive shaft 32 and is secured thereto by a collar 34.

The main drive shaft 32 is positioned substantially parallel to the shaft 24 of the motor 20 and is supported adjacent its extremities by the supporting arms 36 and 38 of the generally E-shaped drive unit mounting bracket 40. Suitable bearings, such as 42 and 44, are provided at the point of support of the main drive shaft 32 by the supporting arms 36 and 38 in order to reduce the frictional drag tending to impede the free rotation of the shaft 32.

The main drive shaft 32 is supported in the vicinity of its mid-length by the intermediate supporting arm 37 of the drive unit mounting bracket 40. Suitable bearings 39 are positioned intermediate the main drive shaft 32 and the intermediate supporting arm 37 to reduce the frictional drag of the mounting. Mounted adjacent the intermediate supporting arm 37 and positioned by the flanged collars 70 and 45 are suitable thrust bearings 41 and 43.

The main drive shaft 32 is rotated at constant speed by the constant speed motor 20 through the engagement of the gears 30 and 28. Slidably mounted on the main drive shaft 32 and rotating in conjunction therewith is a wheel 46. The main drive shaft 32 is provided with a key 48 along a substantial portion of its length intermediate the supporting arm 38 and the intermediate supporting arm 37 which engages a similarly sized and shaped key-way in the wheel 46 causing the wheel 46 to rotate in conjunction with the rotation of shaft 32 but permitting longitudinal movement of the wheel 46 along the main drive shaft 32. The wheel 46 is provided with a peripheral surface 50 of a material having a relatively high coefficient of friction, such as soft rubber, felt, or other suitable compressible material having a relatively high coefficient of friction.

The main drive shaft 32 is positioned so as to cause the peripheral surface 50 of the wheel 46 to tangentially engage the surface 52 of a horizontally positioned driving disc 54. The driving disc 54 is rotatably mounted beneath the main drive shaft 32 on the driving disc shaft 56 which is mounted on and supported by the intermediate horizontal platform 12. Rotation of the wheel 46 in response to rotation of the main drive shaft 32 results in rotation of the driving disc 54 through the frictional engagement between the peripheral surface 50 of the wheel 46 and the surface 52 of the driving disc 54. The surface 52 of the driving disc 54 may be roughened or coated with a suitable material of relatively high coefficient of friction to improve the above mentioned frictional engagement between the surface 50 of the wheel 46 and the surface 52 of the disc 54. The driving disc 54 is maintained in a substantially horizontal position and together with the driving disc shaft 56 is prevented from deflecting under the weight of the wheel 46 and the remainder of the drive unit mounting bracket 40 by a vertical supporting roller 58 mounted on the upright supporting column 60 positioned beneath the periphery of the driving disc 54.

The generally E-shaped drive unit mounting bracket 40 and the components mounted thereon are partially supported by the coaxial dual mounting lugs 62 and 64 secured to the vertical supporting member 18. (See Fig. 2.) The supporting arms 36 and 38 of the drive unit mounting bracket 40 terminate in lugs 66 and 68 which are positioned within the bifurcated mounting lugs 62 and 64 by suitable pins or other connecting members. The above described mounting results in the weight of the drive unit mounting bracket 40 and the components mounted thereon being partially supported by the driving disc 54 at the point of contact therewith of the wheel 46. The downward force of the weight of the drive unit mounting bracket 40 aids in maintaining the frictional engagement between the peripheral surface 50 of the wheel 46 and the upper surface 52 of the driving disc 54. To further the maintenance of this frictional engagement, there is also provided a spring 74 having one end 72 connected to the drive unit mounting bracket 40 and having its other end secured to a mounting lug 76 attached to the intermediate horizontal platform 12. The tension of the spring 74 aids in maintaining the surface 50 of the wheel 46 in frictional engagement with the surface 52 of the driving disc 54.

Secured to the hub of driving disc 54 and rotating therewith is a gear 78. Meshing with the gear 78 and driven thereby is a companion gear 80 mounted on and driving a vertical shaft 82. The shaft 82 is positioned at its upper extremity by a flanged collar 84 secured to the upper horizontal supporting platform 16, and supported at its lower extremity by a flanged collar 86 secured to the lower horizontal supporting platform 14. The approximate mid-length of the shaft 82 is encompassed and positioned at the point of junction with the intermediate horizontal supporting platform by a flanged collar 88. The flanged collars 84, 86 and 88 may provide a mounting, if desired, for suitable bearings to reduce the frictional drag tending to impede rotation of the shaft 82.

Mounted on the shaft 82 and on the portion thereof disposed between the intermediate horizontal platform 12 and the lower horizontal platform 14 is a score paper drive drum 90 for the score paper advancing unit designated generally as B on Fig. 1.

The score paper drive drum 90 is cylindrical in shape and preferably of a length slightly greater than the width of the score paper 92 which is passed over said drum 90. Positioned on the surface of the score paper drive drum 90, adjacent each of its extremities, are a plurality of regularly spaced conical teeth 94 shaped to engage a series of correspondingly spaced holes 96 adjacent the edges of the score paper 92. Rotation of the score paper drive drum 90 results in movement of the score paper 92 by the sprocket action of the teeth 94 in the holes 96. The details of the score paper advancing unit will be described at a later point in this specification.

Figure 3:
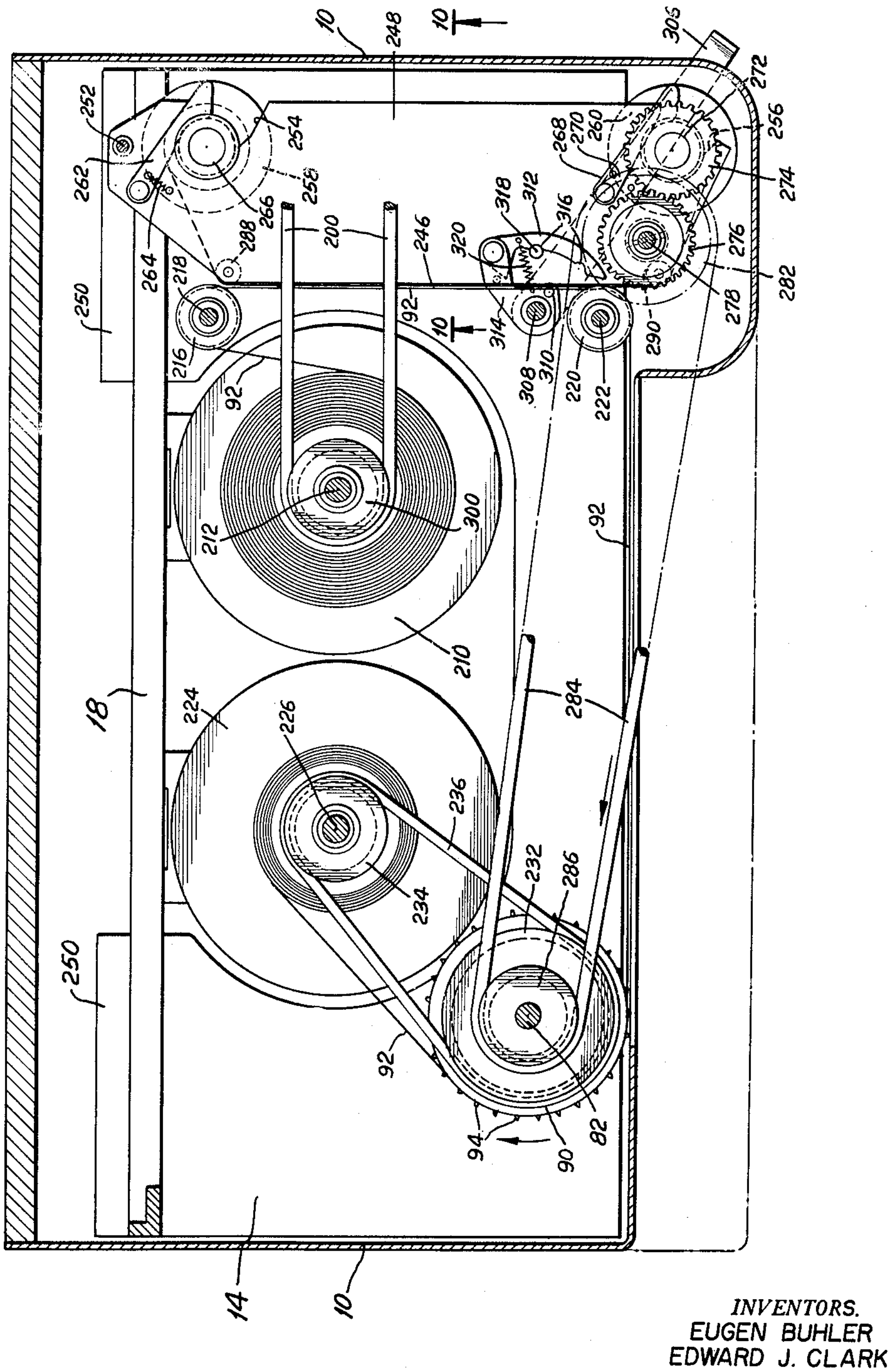
Fig. 3 is a plan view on the line 3—3 of Fig. 1.

In summary, the drive unit A mechanically transmits the rotative power of the motor 20 into rotation of the score paper drive drum 90. For conventionally advancing the score paper 92 past the printing assembly C through rotation of the score paper drive drum 90, the motor 20 and the gear 28 associated therewith are rotated in a clockwise direction, as seen from the end of the shaft 24, looking past the collar 26 towards the gear 28. The gear 30 and the main drive shaft 32, being driven by the motor 20 and the gear 28, are rotated in a counterclockwise direction, as seen from the end of the shaft 32, looking past the collar 34 towards the gear 30. Rotation of the shaft 32 in a counterclockwise direction results in rotation of the wheel 46 mounted thereon in the same direction. The counterclockwise rotation of the wheel 46 drives the driving disc 54 and the gear 78 secured thereto in a counterclockwise direction, i. e., in the direction of the arrow as shown in Fig. 2. Counterclockwise rotation of the gear 78 drives the companion gear 80 and the shaft 82 in a clockwise direction, i. e., in the direction of the arrow as shown in Fig. 2. Clockwise rotation of the shaft 82 results in clockwise rotation of the score paper drive drum 90 mounted thereon, i. e., in the direction of the arrow as shown in Fig. 3, which in turn moves the score paper 92 from right to left past the printing assembly C as illustrated by the arrow in Fig. 1.

Included in the drive unit A of the score paper drive assembly are means by which the rate of advance of the score paper 92 past the printing assembly C may be varied in accordance with the tempo of the composition to be played. It is apparent from the above portion of the specification and from the drawings, that since the motor 20 is preferably of the type having a constant speed characteristic, the speed of rotation of the score paper drive drum 90, and consequently the rate of advance of the score paper 92 past the printing assembly C, will be constant for any given longitudinal location of the wheel 46 on the main drive shaft 32. The speed of rotation of the driving disc 54 and consequently of the score paper drive drum 90 is a function of the radial distance between the point of contact of the surface 50 of the wheel 46 on the surface 52 of the driving disc 54 and the axis of the shaft 56 on which the driving disc 54 is mounted. If the radial distance between the center of the shaft 56 and the point of contact between the surface 50 of the wheel 46 and the surface 52 of the driving disc 54 is small, the driving disc 54 will be driven at a relatively high speed, whereas, if the radial distance between the center of the shaft 56 and the point of contact between the surface 50 of the wheel 46 and the surface 52 of the driving disc 54 is large, i. e., when the wheel 46 is moved longitudinally along the shaft 32 away from the supporting arm 38 towards the intermediate supporting arm 37, the driving disc will be driven at a relatively low speed. As the score paper drive drum 90 is mounted on the shaft 82 which is mechanically geared to and responsive to the speed of rotation of the driving disc 54, the speed of rotation of the drum 90 will vary in accordance with the speed of rotation of the driving disc 54. The rate of advance of the score paper 92 past the printing assembly C is determined by the speed of rotation of the score paper drive drum 90.

In the presently preferred embodiment of the invention, as illustrated in the drawings, the rate of advance of the score paper 92 is preferably controlled by varying the radial distance between the center of the shaft 56 and the point of contact between the surface 50 of the wheel 46 and the surface 52 of the driving disc 54.

To vary the rate of advance of the score paper 92 past the printing assembly C by varying the radial distance between the center of the shaft 56 and the point of contact between the surface 50 of the wheel 46 and the surface 52 of the driving disc 54, there is provided an auxiliary shaft 100 disposed parallel to the main drive shaft 32. The auxiliary shaft 100 is supported at one extremity by the supporting arm 38 of the drive unit mounting bracket 40 and at its other extremity by an auxiliary supporting arm 102 positioned adjacent to the supporting arm 36 and forming a part of the drive unit mounting bracket 40. Mounted on and encompassing the auxiliary shaft 100 is a slidable carriage 104 having a downwardly disposed horizontal roller 106 positioned within a flanged collar 108 forming a part of the mounting unit for the wheel 46 which is slidably keyed to the main drive shaft 32 (see Figs. 1, 2 and 4). The auxiliary shaft 100 is provided with a recessed spiral channel 110 and a guiding pin 112, rigidly mounted in the carriage 104, rides therein.

Figure 4:
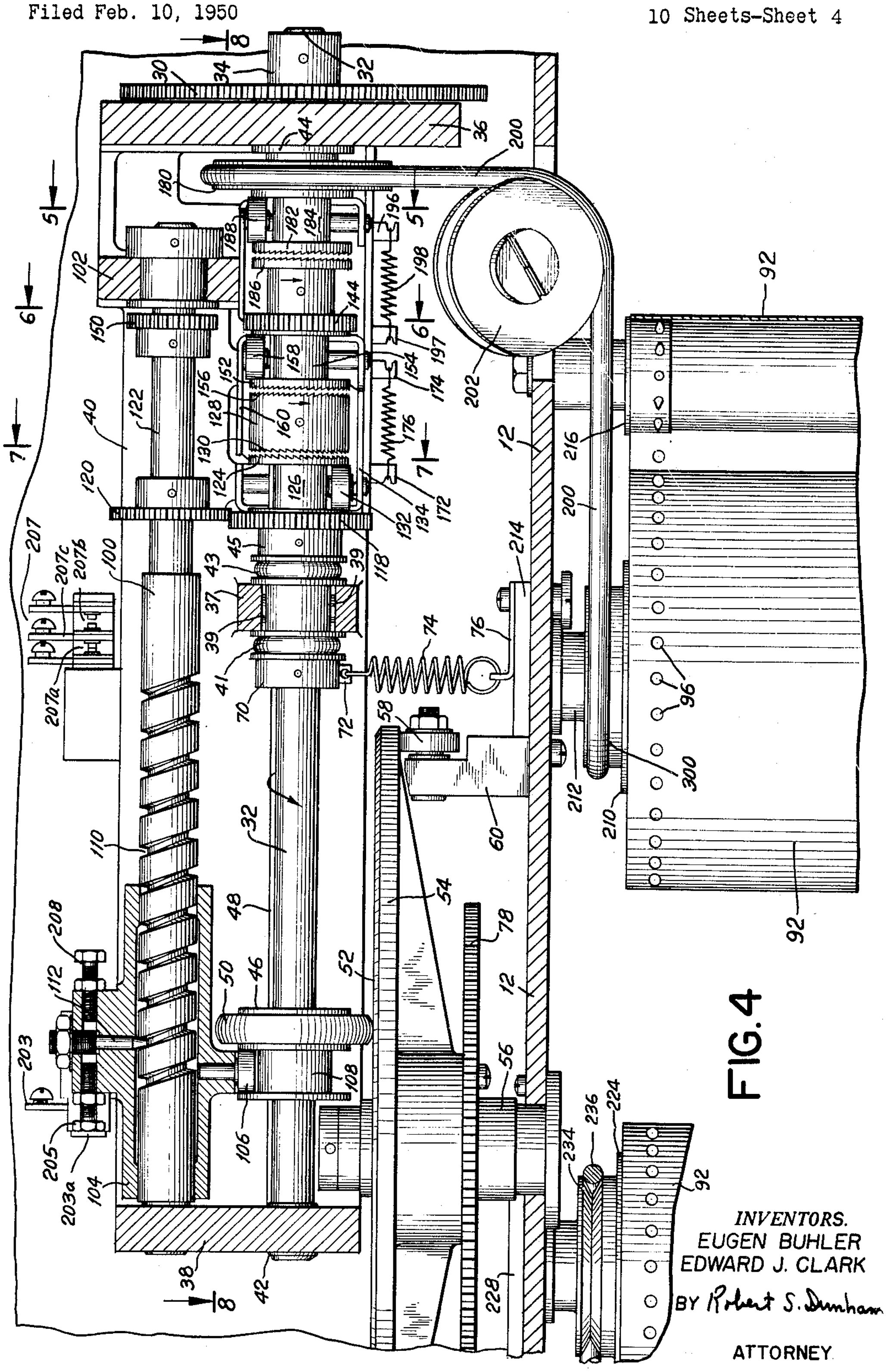
Fig. 4 is an elevation on the line 4—4 of Fig. 2.
Figure 5:
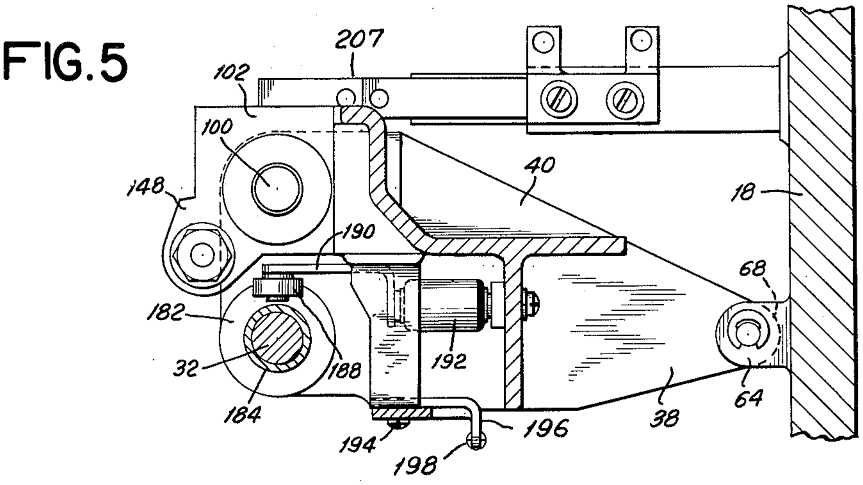
Fig. 5 is a side section on the line 5—5 of Fig. 4.
Figure 6:
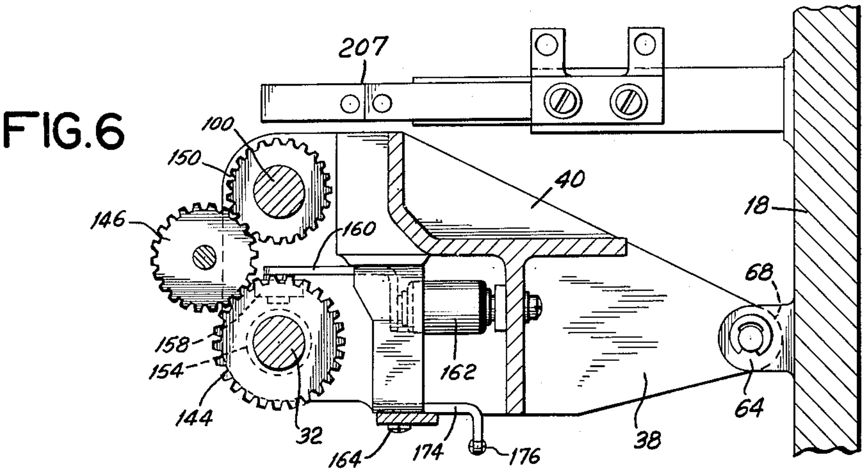
Fig. 6 is a side section on the line 6—6 of Fig. 4.
Figure 7:
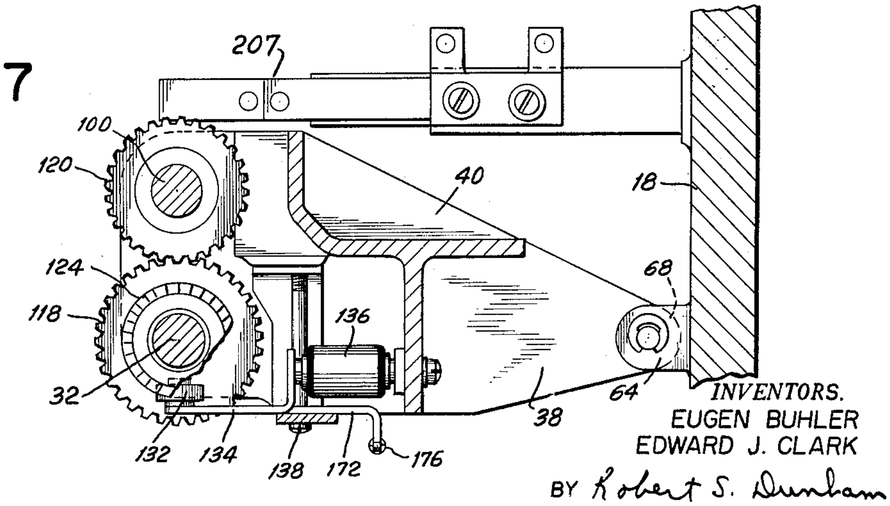
Fig. 7 is a side section on the line 7—7 of Fig. 4.

If the auxiliary shaft 100 is rotated in a clockwise direction as seen looking from the supporting arm 102 towards the supporting arm 38, the carriage 104, through the action of the recessed spiral channel 110 and the guiding pin 112, is moved from left to right as illustrated in Fig. 4. The movement of the carriage 104 from left to right, i. e., away from the supporting arm 38, moves the wheel 46 longitudinally from left to right on the shaft 32 and increases the radial distance between the center of the shaft 56 and the point of contact between the surface 50 of the wheel 46 and the surface 52 of the driving disc 54. The displacement of the wheel 46 and the increase in the radial distance on the disc 54 reduces the rate of rotation of said disc 54 and consequently reduces the rate of advance of the score paper 92 past the printing assembly C.

If the auxiliary shaft 100 is rotated in a counterclockwise direction, the carriage 104, through the action of the recessed spiral channel 110 and the guiding pin 112, is moved in a direction towards the supporting arm 38 of the drive unit mounting bracket 40, i. e., from right to left as illustrated in Fig. 4. The movement of the carriage 104 towards the supporting arm 38 of the drive unit mounting bracket 40 moves the wheel 46 longitudinally along the shaft 32 in a direction towards the center of the shaft 56 supporting the driving disc 54. The displacement of the wheel 46 towards the center of the driving disc 54 decreases the radial distance between the center of the shaft 56 and the point of contact between the surface 50 of the wheel 46 and the surface 52 of the disc 54, and results in an increase in the speed of rotation of the said driving disc 54. The increase in the speed of rotation of the disc 54 results in an increase in the rate of advance of the score paper 92 past the printing assembly C.

To provide for clockwise and counterclockwise rotation of the auxiliary shaft 100 there are provided two separate clutching mechanisms associated with the main drive shaft 32. To rotate the auxiliary shaft 100 in a clockwise direction, in order to decrease the rate of advance of the score paper 92, there is provided a gear 118 rotatably mounted on the main drive shaft 32. The gear 118 meshes with a pinion 120 mounted on the reduced portion 122 of the auxiliary shaft 100. The gear 118 is secured to a clutch plate 124 by a collar 126 which encompass the main drive shaft 32. The clutch plate 124, the collar 126, and the gear 118 encompass the main drive shaft 32 in such a manner as to permit independent rotation of said main drive shaft 32. Mounted on the shaft 32 and rotating therewith is a clutch member 128 having a plurality of teeth 130 positioned on its periphery. The clutch plate 124 has a corresponding toothed periphery adapted to be engaged and driven by the toothed periphery 130 of the clutch member 128. Positioned intermediate the gear 118 and the clutch plate 124 and adjacent the collar 126 is a roller 132 mounted on an armature 134 of a pair of clutching magnets 136 (see Fig. 7). Energization of the magnets 136 causes the armature 134 to move about the armature pivot 138 and move the clutch plate 124 into clutching engagement with the clutch member 128 mounted on the main drive shaft 32. When the clutch plate 124 is in clutching engagement with the clutch member 128, the clutch plate 124, the collar 126 and the gear 118 are driven by and rotate in conjunction with the rotation of the main drive shaft 32. The rotation of the gear 118 in a counterclockwise direction, i. e., the direction of rotation of the shaft 32, drives the pinion 120 and the auxiliary shaft 100 in a clockwise direction. Rotation of the auxiliary shaft 100 in a clockwise direction moves the sliding carriage 104 from left to right, increasing the radial distance between the center of the shaft 56 and the point of contact between the surface 50 of the wheel 46 and the surface 52 of the driving disc 54 which decreases the speed of rotation of the driving disc 54. The decrease in the speed of rotation of the drive disc 54 results in a decrease in the speed of rotation of the score paper drive drum 90 and a consequent decrease in the rate of advance of the score paper 92 past the printing assembly C.

To increase the rate of advance of the score paper 92 past the printing assembly C, by moving the carriage 104 so as to decrease the radial distance between the center of the shaft 56 and the point of contact between the surface 50 of the wheel 46 and the surrface 52 of the driving disc 54, it is necessary to rotate the auxiliary shaft 100 in a counterclockwise direction. To rotate the auxiliary shaft 100 in a counterclockwise direction, there is provided a gear 144 rotatably mounted on the main drive shaft 32. The gear 144 meshes with an idler gear 146 (see Figs. 5 and 6) rotatably mounted in a supporting member 148 forming part of the drive unit mounting bracket 40. The idler gear 146 meshes with a pinion 150 mounted on the reduced portion 142 of the auxiliary shaft 100. The gear 144 is secured to a clutch plate 152 by a collar 154 encompassing the main drive shaft 32. The clutch plate 152, the collar 154, and the gear 144 encompass the main drive shaft 32 in such a manner as to permit independent rotation of the main drive shaft 32 apart from the above mentioned elements. Mounted on the shaft 32 and rotating therewith is the clutch member 128, having a plurality of teeth 156 positioned on its periphery adjacent the clutch plate 152. The clutch plate 152 has a corresponding toothed periphery adapted to be engaged and driven by the toothed periphery 156 of the clutch member 128. Positioned intermediate the gear 144 and the clutch plate 152 and adjacent the collar 154 is a roller 158 mounted on the armature 160 of a pair of clutching magnets 162 (see Figs. 5, 6 and 8). Energization of the pair of clutching magnets 162 causes the armature 160 to move about the armature pivot 164 and move the clutch plate 152 into clutching engagement with the clutch member 128. When the clutch plate 152 is in clutching engagement with the clutch member 128, the clutch plate 152, the collar 154 and the gear 144 are driven by and rotate in conjunction with the rotation of the main drive shaft 32. The rotation of the gear 144 in a counterclockwise direction, i. e., the direction of rotation of the shaft 32, rotates the idler gear 146 in a clockwise direction. Rotation of the idler gear 146 in a clockwise direction drives the pinion 150 and the auxiliary shaft 100 in a counterclockwise direction. Rotation of the auxiliary shaft 100 in a counterclockwise direction moves the sliding carriage 104 from right to left decreasing the radial distance between the shaft 56 and the point of contact of the surface 50 of the wheel 46 and the surface 52 of the driving disc 54 which increases speed of rotation of said drive disc 54. The increase in the speed of rotation of the drive disc 54 results in an increase in the speed of rotation of the score paper drive drum 90 and a consequent increase in the rate of advance of the score paper 92 past a printing assembly C.

The above described clutching mechanisms adapted for either increasing or decreasing the rate of advance of the score paper 92 past the printing assembly C are electrically controlled by the pairs of clutching magnets 136 and 162. Suitable electrical circuits, to be described at a later point in the specification, including an external push button control system for energizing said pairs of clutching magnets 136 and 162, are provided. The clutching mechanisms are maintained in clutching relationship during the period of energization of the clutching magnets 162 and 136.

Mounted on the sliding carriage 104 is an indicating pointer 170 (see Fig. 2) extending through an aperture 171 in the front of the housing 10. The pointer 170 is adapted to be moved along a scale or index in accordance with the position of the carriage 104 on the auxiliary shaft 100 to provide a suitable external indication of the rate of score paper advance. The scale or index, suitably mounted adjacent the aperture 171 in the external housing 10 and located so as to be readily visible to the user may be calibrated, if desired, in terms of tempo, i. e., number of beats per minute.

To provide an automatic disengagement of the above described clutches, i. e., when the electric circuits including the clutching magnets 136 and 162 are opened, the armatures 134 and 160 are each provided with extended disengaging arms 172 and 174, respectively. Connected in tension between the ends of the extended portions 172 and 174 is a declutching spring 176 (best illustrated in Fig. 4). The tension of the declutching spring 176 tends to force the extended disengaging arms 172 and 174 towards each other. Under the influence of the force of the spring 176, the leverage obtained by the extent of the disengaging arms 172 and 174 acts to move the clutch plates 124 and 152 out of clutching engagement with the rotating clutch member 128. The above described declutching mechanism maintains the clutch plates 124 and 152 out of clutching engagement with the clutch member 128 whenever the clutching magnets 136 and 162 are in a deenergized condition.

Figure 8:
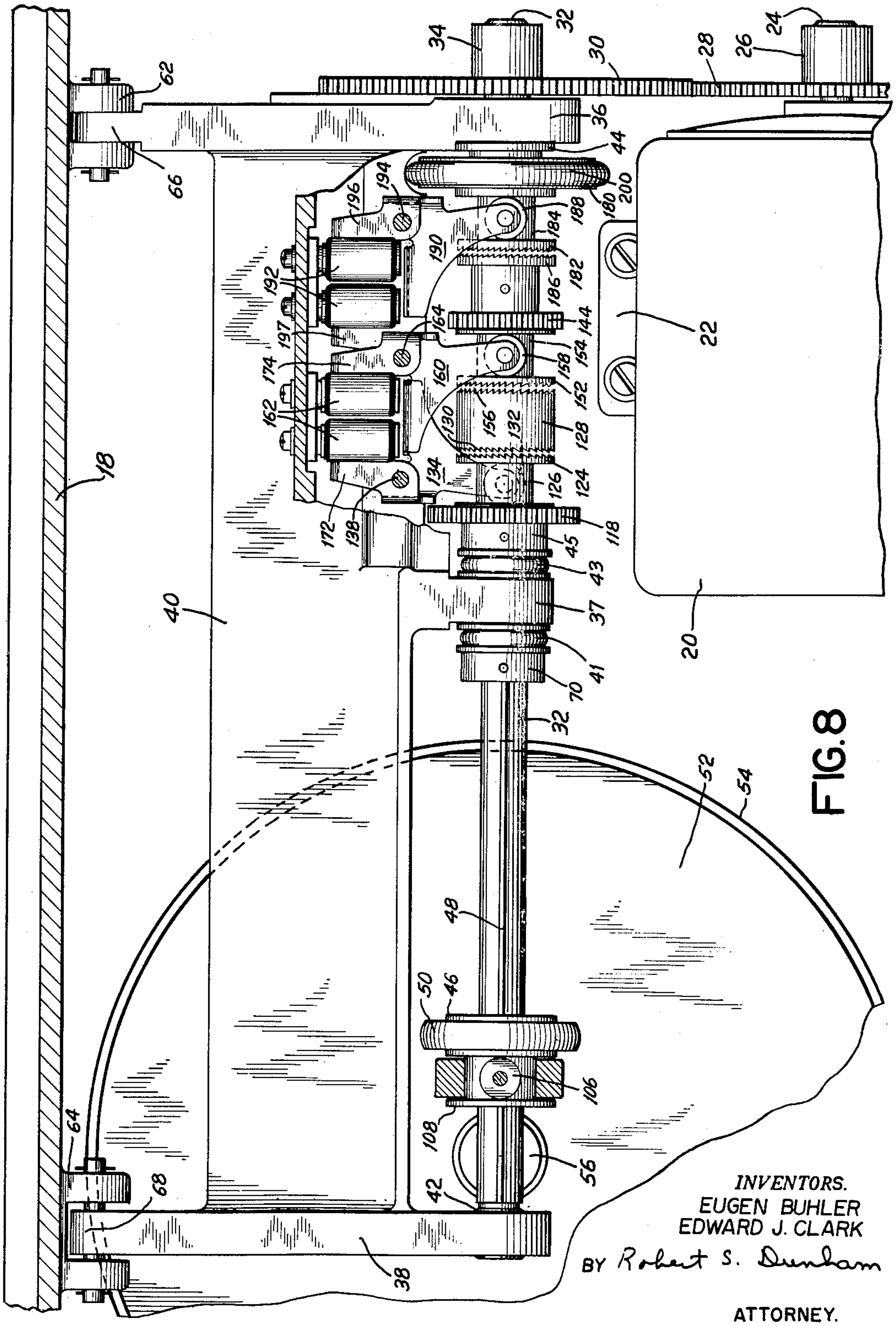
Fig. 8 is a plan view on the line 8—8 of Fig. 4.

In addition to the above described clutching mechanisms for increasing or decreasing the rate of advance of the score paper 92 past the printing assembly C in accordance with the tempo of the composition to be played, a rewind drive assembly is incorporated in the drive unit to provide for rewinding of the score paper after use. The rewind drive assembly is best illustrated in Figs. 2, 4 and 8.

Included in the rewind mechanism is the rewind drive pulley 180 rotatably mounted on the main drive shaft 32 adjacent the supporting arm 36. Connected to the rewind drive pulley 180 is the rewind clutch plate 182 and a collar 184 encompassing the main drive shaft 32. Mounted adjacent the rewind clutch plate 182 and rotatively secured to the main drive shaft 32 is the rewind clutch member 186. The rewind clutch member 186 is secured to the main drive shaft 32 and continuously rotates in conjunction therewith. Positioned on the adjacent contiguous surfaces of the rewind clutch member 186 and the rewind clutch plate 182 are a plurality of correspondingly positioned teeth to provide a suitable clutching engagement when the rewind clutch plate 122 is moved into clutching engagement with the rewind clutch member 186. Positioned intermediate the rewind pulley 180 and the rewind clutch plate 182 and adjacent to the collar 184 is a roller 188 mounted on the armature 190 of a pair of rewind magnets 192 (see Figs. 5 and 8). Energization of the rewind magnets 192 causes the rewind armature 190 to rotate around the rewind armature pivot point 194 and moves the rewind clutch plate 182 into clutching engagement with the rewind clutch member 186. When the rewind clutch plate 182 is placed in clutching engagement with the rewind clutch member 186, the clutch plate 182, the collar 184, and the rewind drive pulley 180 are driven by and rotate in conjunction with the rotation of the main drive shaft 32.

To provide for disengagement of the rewind clutch plate 182 from the rewind clutch member 186 the armature 190 is provided with an extended declutching arm 196. Secured in tension between the declutching arm 196 and a fixed arm 197 is a declutching spring 198. The tension of the declutching spring 198 tends to force the declutching arm 196 towards the fixed arm 197. Under the influence of the force of the spring 198, the leverage obtained by the extent of the declutching arm 196 acts to move the rewind clutch plate 182 out of clutching engagement with the rotating rewind clutch member 186. The above described declutching mechanism maintains the rewind clutch plate 182 out of clutching engagement with the rewind clutch member 186 whenever the rewind magnets 192 are in a deenergized condition. Suitable electrical circuits, to be described in detail at a later point in this specification, are provided for the energization of the pair of rewind magnets 192.

The rewind clutch plate 182 is maintained in clutching engagement with the rewind clutch member 186 as long as the rewind magnets 192 are maintained in an energized condition. During such intervals the rewind drive pulley 180 will be driven by and rotated in conjunction with the main drive shaft 32. When the pair of rewind magnets 192 are deenergized, the declutching spring 198, acting upon the extended declutching arm 196 of the armature 190 will, through the leverage of the armature 190, cause the roller 188 to move the rewind clutch plate 182, the collar 184, and the rewind drive pulley 180 out of clutching engagement with the rewind clutch member 186.

Mounted on the rewind drive pulley 180 is the rewind drive belt 200. The rewind drive belt 200 passes over a pair of idler pulleys 202 and then is led down a pulley 300 attached to a score paper reel 210 in the score paper advancing assembly. The details of the score paper advancing assembly, together with the details of the remainder of the rewind system will be described at a later point in this specification.

Figure 15:
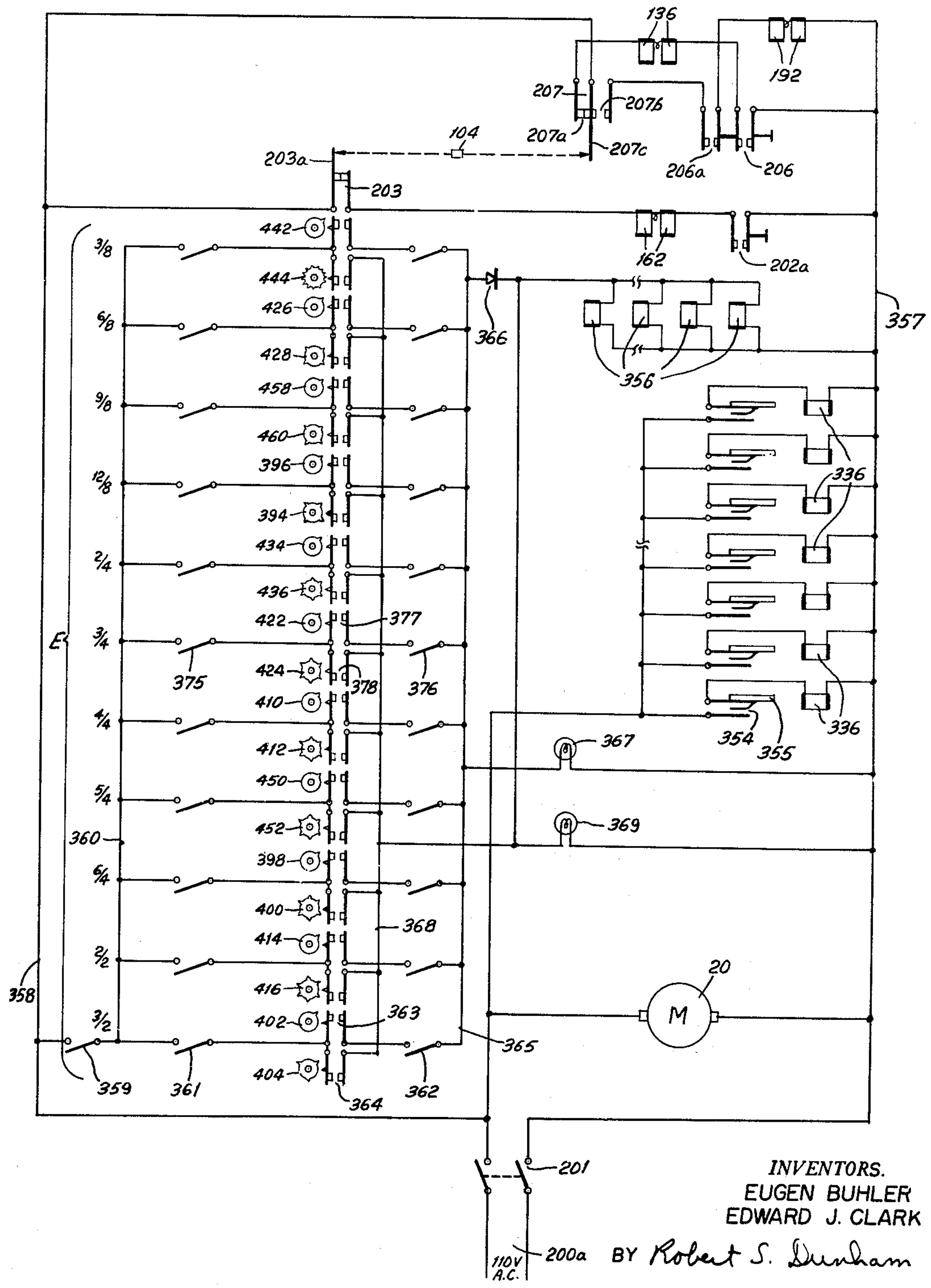
Fig. 15 is a circuit diagram of the electrical circuits included in the invention.

The presently preferred electrical circuits associated with the drive unit are illustrated in Fig. 15. The music recording device is adapted to be connected to and powered by a standard source of 110 volt A. C. 200*a* through a suitable switch 201. The constant speed electric motor 20 described above and illustrated in Figs. 1, 2 and 8 is connected directly across the A. C. line and hence, after closure of the switch 201, the motor continuously rotates at a constant speed until the power circuit is opened.

The mechanical clutching arrangement for varying the rate of advance of the score paper 92 past the printing station C in accordance with the tempo of the composition to be played, has been described in detail above. At that point in the specification, the operations of the various clutching mechanisms were described in terms of the energization and deenergization of the respective pairs of clutching magnets. The series connected clutching magnets 162 (see Fig. 8) associated with the assembly for engaging of the clutch plate 152 with the rotating clutch member 156 in order to increase the rate of advance of the score paper 92 past the printing assembly C, are connected in series to the manually operated fast tempo switch 202*a* and a safety switch 203 across the A. C. line. The fast tempo switch 202*a* is manually operated by the operator of the instrument and is conveniently located on a portion of the external housing 10. When the fast tempo switch 202*a* is closed, a circuit is completed through the series connected clutching magnets 162 and the resultant current flow therethrough energizes said magnets. The energization of the clutching magnets 162 results in movement of the armature 160 which, in turn, moves the clutch plate 152 into clutching engagement with the rotating clutch member 128. When the clutch plate 152 is moved into clutching engagement with the rotating clutch member 128, the gear 144 is driven by and rotated in conjunction with the rotation of the main drive shaft 32 (see Fig. 4). The counterclockwise rotation of the gear 144 drives the idler gear 146 in a clockwise direction, which, in turn, drives the gear 150 and the auxiliary shaft 100 in a counterclockwise direction. Counterclockwise rotation of the auxiliary shaft 100 moves the sliding carriage 104 towards the supporting arm 38 and increases the speed of rotation of the driving disc 54 and the rate of advance of the score paper 92 past the printing assembly C. The clutching magnets 162 will remain energized and the sliding carriage 104 will be moved longitudinally along the auxiliary shaft 100 as long as the fast tempo switch 202*a* is closed. Upon opening of the fast tempo switch 202*a*, the circuit will be broken, the clutching magnets 162 will be deenergized, and the sliding carriage 104 halted in its movement longitudinally along the auxiliary shaft 100.

To prevent overrunning of the upwardly extending portion of the shaft 56 by the wheel 46 mounted on the main drive shaft 32 and its accompanying flanged collar 108, a safety switch 203 is provided to deenergize the clutching magnets 162 when such overrunning is imminent. Mounted on the vertical supporting wall 18 (see Figs. 1, 2 and 4) is the safety switch supporting arm 204. Monnted on the end of the safety switch supporting arm 204 and extending towards the auxiliary shaft 100 is the safety switch 203. The safety switch 203 is constructed so as to be normally closed to complete the energizing circuit for the clutching magnets 162. Mounted on the sliding carriage 104 is an adjustable switch actuating arm 205 which is positioned to contact an extension of one of the arms 203*a* of the safety switch 203 and open said switch 203 when the wheel 46 is adjacent to and moving toward the upwardly extending portion of the shaft 56 of the driving disc 54.

Continual depression of the fast tempo switch 202*a* and the resultant continuous movement of the sliding carriage 104 longitudinally along the auxiliary shaft 100 towards the supporting arm 38 thus eventually results in the opening of the safety switch 203 by the safety switch actuating arm 205. When the safety switch 203 is opened, the circuit for the clutching magnets 162 is broken and said magnets 162 are automatically deenergized. When the magnets 162 are deenergized, the declutching mechanism described above operates and the movement of the sliding carriage 104 along the auxiliary shaft 100 is halted.

The series connected clutching magnets 136 (see Fig. 6), associated with the assembly for engaging the clutch plate 124 with the rotating clutch member 128 in order to decrease the rate of advance of the score paper 92 past the printing assembly C, are connected in series across the A. C. line with the manually operated slow tempo switch 206 and an automatic rewind switch 207. When the slow tempo switch 206 is closed, a circuit is completed through said switch 206, through the series connected clutching magnets 136 and through the normally closed contacts 207*a* of the automatic rewind switch 207. The automatic rewind switch 207 is of the "make before break" type and is normally in the position illustrated in Fig. 15, i. e., the points 207*a* being closed partially completing the circuit for the clutching magnets 136. Energization of the clutching magnets 136 by closure of the slow tempo switch 206 results in movement of the armature 134 which, in turn, moves the clutch plate 124 into clutching engagement with the rotating clutch member 128. When the clutch plate 124 is moved into clutching engagement with the clutch member 128, the gear 118 is driven by and rotates in conjunction with the main drive shaft 32. Rotation of the gear 118 results in clockwise rotation of the pinion 120 mounted on the auxiliary shaft 100 and similar rotation of the shaft 100. When the auxiliary shaft 100 is rotated in a clockwise direction, the sliding carriage 104 is moved from left to right, i. e., away from the supporting arm 38, and the speed of rotation of the driving disc 34 is decreased with a resultant decrease in the rate of advance of the score paper 92 past the printing assembly C.

In order to effectively operate the score paper rewind mechanism, it is necessary to disengage the drive unit from the score paper advancing assembly. This is accomplished by moving the wheel 46 out of engagement with the surface 52 of the driving disc 54. In the preferred embodiment of the invention, as illustrated in the drawings, the disengagement of the wheel 46 from the driving disc 54 is accomplished by maintaining the slow tempo switch 206 closed until the wheel 46 moves off the surface 52 of the driving disc 54. Closure of the slow tempo switch 206 mechanically closes the adjacent switch points **206*a* in addition to completing the circuit for the clutching magnets 136. The switch points 206*a* are connected in series with the rewind clutching magnets 192, however, the normally open switch points 207*b* are also included in the circuit for the rewind clutching magnets 192, and prevent energization of said magnets 192 when switch points 206*a* are closed. When the sliding carriage 104 moves a distance sufficient to move the wheel 46 completely off the surface 52 of the drive disc 54, the rewind switch actuating arm 208 mounted on the sliding carriage 104 closes the switch points 207*b* by moving the wand 207*c*, and, after closure of said switch points 207*b* by movement of the wand 207*c* a sufficient distance, the switch points 207*a* are opened. Closure of switch points 207*b* completes the series circuit through the series connected rewind clutching magnets 192, and the switch points 206*a* (maintained in a closed condition by the continual depression of the slow tempo switch 206). After the rewind clutching magnets 192 have been energized, the switch points 207*a* are opened as described above, deenergizing the clutching magnets 136 and halting the movement of the sliding carriage 104 along the auxiliary shaft 100. The energization of the rewind clutching magnets 192 moves the armature 190 (see Fig. 8) which moves the rewind clutch plate 182 into clutching engagement with the rewind clutch member 186 (see Fig. 8). When the rewind clutch plate 182 is placed in clutching engagement with the rewind clutch member 186, the rewind pulley 180 is driven by and rotates in conjunction with the main drive shaft 32. The rewind clutching magnets 192 will remain energized until the slow tempo switch 206 is opened with the accompanying opening of the switch points 206*a***.

Consequently, to operate the rewind mechanism in the embodiment of the invention illustrated in the drawings, all that is necessary is the maintenance of the closure of the slow tempo switch 206 for an extended period of time. After the wheel 46 has moved out of contact with the surface 52 of the driving disc 54, the rewind clutching magnet 192 is automatically energized, and will stay in an energized condition as long as the slow tempo switch 206 is maintained in closed position. When the slow tempo switch 206 is released or opened, the switch points **206*a* will also open and the rewind clutch magnets 192 are deenergized; the declutching mechanism associated with the rewind clutch assembly, as described above, will automatically operate to declutch the rewind pulley 180 and stop the rewind operations. To reestablish movement of the score paper 92 past the printing assembly C, it is necessary to return the wheel 46 into engagement with the surface 52 of the drive disc 54. This may be accomplished by closing the fast tempo switch 202** in the manner described above.

The above described drive unit provides a mechanical drive for the score paper advancing drum 90 which in turn advances the score paper 92 past the printing assembly C. Included in this score paper drive unit and described above are means for increasing or decreasing the rate of advance of the score paper 92 past the printing assembly C in accordance with the tempo of the composition to be played. The rate of advance of the score paper 92 as indicated by the pointer 170 (see Fig. 2) on a suitable scale or index may be calibrated in accordance with the tempo of the composition to be played, and hence, this music recording device may be made adaptable to the recording of musical compositions played at any prescribed tempo, and in addition, provides a conventional and novel way of accommodating variations in tempo within a single musical composition.

*(c) The score paper advancing unit*

Figure 10:
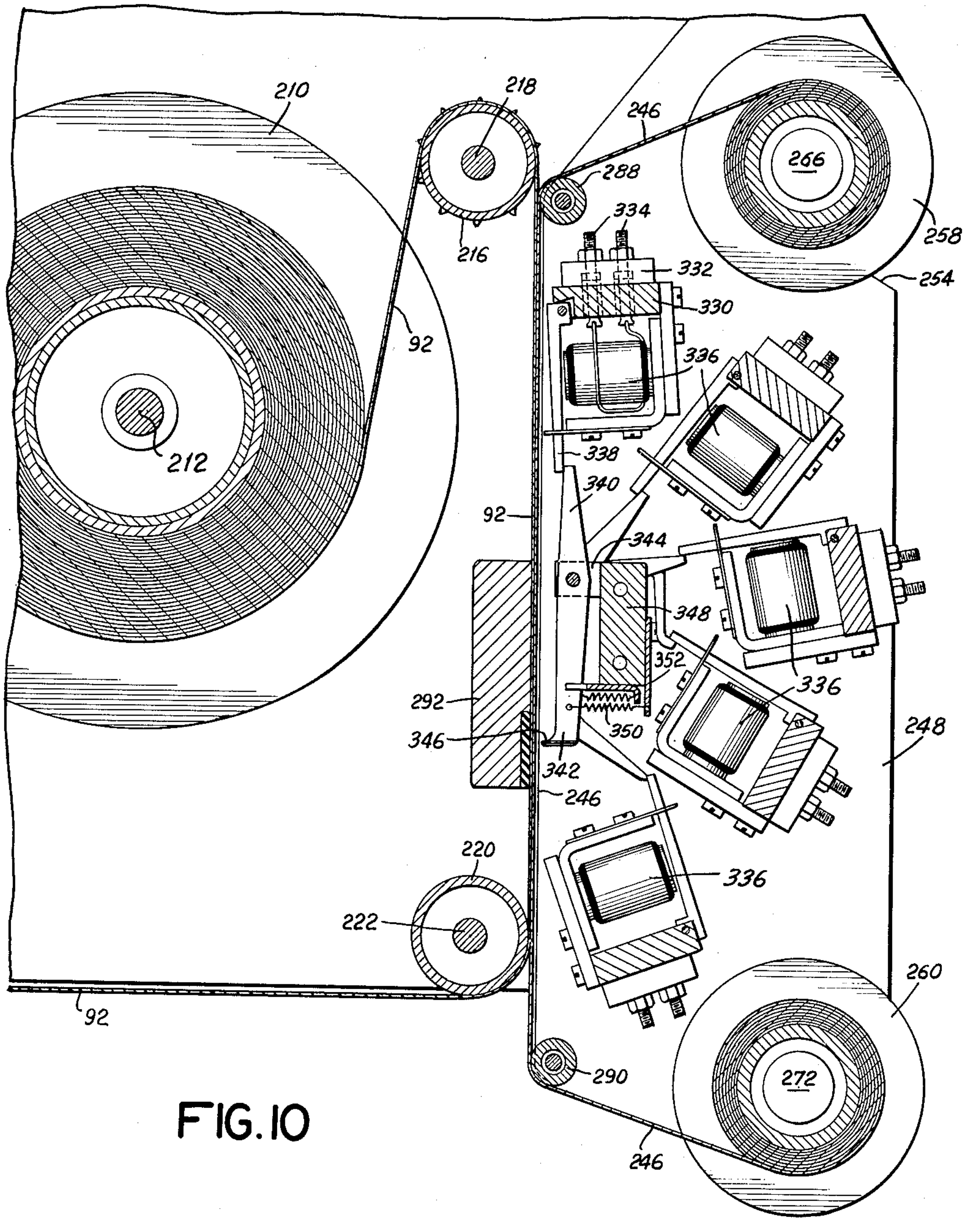
Fig. 10 is a section on the line 10—10 of Fig. 3.

Referring now to Figs. 1, 3 and 10, the score paper advancing unit is largely contained between the intermediate horizontal supporting platform 12 and the lower horizontal supporting platform 14. Included in the score paper advancing unit are the score paper storage drums and associated rollers for directing the advance of the score paper 92 past the printing assembly C. The prime movant for advancing the score paper 92 past the printing assembly C is the cylindrical score paper drive drum 90 having a plurality of conical, or other suitably shaped teeth 94 spaced in predetermined array adjacent each extremity. The score paper drive drum 90 is mounted on the shaft 82, as described above in connection with the score paper drive unit. The score paper drive drum 90 is of a width sufficient to accommodate the width of the score paper 92 to be advanced past the printing assembly C. The score paper 92 is provided with a plurality of holes 96 positioned adjacent its extremities and spaced to engage the teeth 94 disposed on the surface of the score paper drive drum 90.

Positioned between the intermediate horizontal platform 12 and the lower horizontal platform 14 is a score paper storage reel or unwinding drum 210. The score paper unwinding drum 210 is mounted on a rotatable shaft 212 which is supported and positioned at each extremity in suitable mounting brackets or collars 214 secured to the horizontal platforms 12 and 14. If desired, suitable bearings may be located within the mounting brackets 214 to reduce the frictional drag tending to impede rotation of the shaft 212. Wound on the score paper storage drum 210 is a length of score paper 92. During normal operation, the score paper 92 is withdrawn from the score paper storage drum 210 and is passed over a sprocketed idler roller 216 rotatably mounted on a shaft 218. After passing over the idler roller 216, the score paper 92 is then advanced past the printing assembly C in printing relationship with a platen 292 (see Fig. 10) and over a second idler roller 220 mounted on a shaft 222. After passing over the second idler roller 220, the score paper 92 then passes over the score paper drive drum 90 and is wound on the score paper winding drum or reel 224. The score paper winding drum 224 is positioned adjacent to and parallel with the score paper storage or unwinding drum 210 and is mounted on a shaft 226 which is in turn supported at its extremities in suitable mounting members 228 secured to the horizontal platforms 12 and 14. If desired, suitable bearings may be located within the mounting members 228. The drive for the score paper 92 in its passage from the score paper unwinding drum 210, over the idler rollers 216 and 220 and its resultant storage on the score paper winding drum is obtained by the sprocket action of the teeth 94 on the score paper drive drum 90 on the holes 96 positioned adjacent the ends of the score paper 92.

To maintain the portions of the score paper wound upon the winding drum 224 in a tight compact condition during the normal winding operation, the winding drum 224 is rotated at a rate of rotation slightly in excess of the rate of rotation of the score paper drive drum 90. To provide for the differential rates of rotation of the score paper drive drum 90 and the score paper winding drum 224, the score paper drive drum 90 is provided with an adjacent drive pulley 232 connected to a smaller pulley 234 mounted adjacent the winding drum 224 by a flexible belt 236. As the pulley 232 mounted on the score paper drive drum 90 is of a greater diameter than that of the pulley 234 secured to the winding drum 224, the winding drum 224 is driven at a rate of rotation slightly in excess of the rate of rotation of score paper drive drum 90. The differential in diameter of the pulleys 232 and 234 and the resultant differential in rates of rotation between the winding drum 224 and the score paper drive drum 90 ensures a tight compact wind of the score paper 92 on the score paper winding drum 224. To reduce the possibility of breakage of the score paper 92 intermediate the winding drum 224 and the score paper drive drum 90, the belt 236 is preferably loosely engaged with the pulleys 232 and 234 and preferably permits a suitable amount of continuous slippage between the belt 236 and the pulley 234.

When the supply of score paper 92 wound upon the score paper unwinding drum 210 is exhausted, or if it is desired to rewind the score paper at any time, a continual depression of the slow tempo switch 206 (see Fig. 11) in the manner described above, causes the sliding carriage 104 (Fig. 4) to move from left to right. When the wheel 46 is moved past the periphery of the driving disc and out of engagement therewith, rotation of said disc 54 ceases. When the disc 54 ceases rotating, the score paper drive drum 90 also ceases to rotate and the advance of the score paper 92 past the printing assembly C is halted. As also explained above, the movement of the sliding carriage 104 closes the rewind switch 207 which completes the circuit for the rewind clutch magnets throwing in the rewind clutch and resulting in counterclockwise rotation of the rewind pulley 180 mounted on the main drive shaft 32 as seen from the supporting arm 36. The belt 200, after passing over the direction changing idler roller 202, passes over the pulley 300 mounted on the shaft 212 adjacent the score paper unwinding drum 210. Thus, rotation of the rewind pulley 180, through the belt 200, drives the score paper unwinding reel 210 in a clockwise direction, as seen in Fig. 3. The clockwise rotation of the score paper storage reel 210, and the above described disengagement of the drive for the score paper drive drum 90, results in removal of the score paper 92 from the winding reel or drum 224, passage of said paper 92 over the score paper drive drum 90, over the idler roller 220, over the sprocketed idler roller 216 and rewinding of said paper 92 upon the score paper storage drum or reel 210.

To permit the drum or reel 224 to assume its own speed of rotation during the rewind operation, i. e., independent of the speed of rotation of the score paper drive drum 90, the pulley 239 of the score paper drive drum 90 preferably includes an internally disposed ratchet and pawl assembly (not shown) which drives said pulley 239 when said score paper drive drum 90 is rotated clockwise (normal operation) as seen in Fig. 3, and which permits relative movement between said pulley 232 and said score paper drive drum 90 during the rewind operations.

*Carbon paper drive assembly*

Referring to Figs. 3 and 10, there is provided a carbon paper drive assembly for advancing a strip of carbon paper 246, of a width substantially equal to that of the width of the score paper 92, adjacent the advancing score paper, past the printing assembly C. The carbon paper drive assembly is supported by the parallel carbon paper drive assembly mounting brackets 248. The carbon paper drive assembly mounting brackets 248 are mounted on a shaft 252 supported by the score paper drive mounting brackets 250. The utilization of a single shaft mounting permits the carbon paper drive assembly mounting brackets 248 to be pivoted about said shaft 252 when it is desired to rewind the score paper 92. Positioned within suitable shaft receiving notches 254 and 256 in the carbon paper drive assembly mounting brackets 248 are the shaft 266 supporting the carbon paper unwinding reel 258 and the shaft 272 supporting the carbon paper winding reel 260. The shaft 266 of the carbon paper unwinding reel 248 is maintained within the notch 254 of the carbon paper drive mounting bracket 248 by the retaining arm 262 tensioned by the spring 264. The portion of the retaining arm 262 abutting the shaft 266 of the unwinding reel 258 is shaped to conform to the curvature of said shaft. The action of the tensioning spring 264 maintains the retaining arm 262 in retaining engagement with the shaft 266 of the unwinding reel 258 and maintains said reel securely positioned within the notch 254.

In a corresponding manner, the carbon paper winding reel 260 is maintained within the notch 256 by the retaining arm 268 tensioned by the spring 270. The portion of the retaining arm 268 abutting the shaft 272 of the carbon paper winding reel 260 is shaped to conform to the contour of said shaft.

Mounted on the shaft 272 of the carbon paper winding reel 260 is a gear 274. This gear 274 meshes with and is driven by a second gear 276 mounted on the stub carbon paper drive shaft 278 mounted on the intermediate horizontal platform 12. Positioned adjacent the gear 276 on the carbon paper drive shaft 278 is a carbon paper drive pulley 282. Positioned in turning engagement with the carbon paper drive pulley 282 is a flexible belt 284. The flexible belt 284 extends to and is mounted in turning engagement with a pulley 286 positioned adjacent the pulley 232 on the score paper drive drum 90. The pulley 286 on the score paper drive drum 90 is preferably of a smaller diameter than the carbon paper drive pulley 282 on the carbon paper drive drum 280. Consequently the carbon paper winding reel 260 will rotate at a speed of rotation that is less than that of the score paper drive drum 90 occasioned by the linkage between the gears 274 and 276 and the relative diameters of the pulleys 286 and 282.

The carbon paper 246 is removed from the carbon paper unwinding reel 258, passed over an idler roller 288, led past the score paper 92 positioned between the score paper idler rollers 216 and 220, and passed over a second idler roller 290 before being wound on the carbon paper winding reel 260.

The rate of advance of the score paper 92 past the platen 292 (see Fig. 10) is determined by the speed of rotation of the score paper driving drum 90. The rate of advance of the carbon paper 246 past the platen 292 is determined by the rate of rotation of the carbon paper winding reel 260. The diameters of the pulleys 286 and 282 are suitably chosen so that the rate of advance of the carbon paper 246 past the platen 292 will be less than the rate of advance of the score paper 92 past said platen 292. This predetermined differential of rates of advance of the carbon paper 246 and the score paper 92 is maintained irrespective of the speed of advance of the score paper 92.

When it is desired to rewind the score paper 92 upon the unwinding reel 210, it is preferable to remove the carbon paper 246 from its normal location adjacent the score paper 92 in the vicinity of the platen 292 to prevent smudging of the score paper. In addition, as the above described driving mechanism for the carbon paper drive assembly is responsive to the rotation of the score paper drive drum, it is necessary to disassociate the carbon drive assembly from said score paper drive drum 90 as no provision is made in this embodiment of the invention illustrated in the drawings, for driving the carbon paper unwinding reel 258 during the rewind operations. During rewinding of the score paper 92, the score paper drive drum 90 is driven by the score paper 92 and is rotated in a direction opposite to that required during normal advancement of the score paper 92. The carbon paper winding reel 260 is mechanically linked to the score paper drive drum 90, and as the carbon paper unwinding reel 258 is not linked in any way to the score paper drive drum except by the carbon paper 246 itself during the score paper rewinding operation, provision must be made to disengage the carbon paper drive assembly from the score paper advancing assembly.

To disengage the carbon paper drive assembly from operative engagement with the scope paper drive assembly during score paper rewinding operation, there is provided a disengaging lever 306 extending beyond the external housing 10. The disengaging lever 306 is pivoted on the score paper drive assembly mounting bracket 250 by a suitable pivot pin or shaft 308. Mounted on the disengaging lever adjacent the pin 308 is an abutment or pin 310 positioned in engagement with the edge of the carbon paper drive assembly mounting bracket 248. Connected to the disengaging lever 306 is a curved retaining arm 312 pivotally mounted on a connecting member 314. Included in the curved retaining arm 312 are a pair of recesses 316 adapted to engage a locking pin 318 mounted on the carbon paper drive assembly mounting bracket 248. The retaining arm 312 is maintained in compressive engagement with the pin 318 by the tension spring 320 connected between said arm 312 and said lever 306. When the disengaging lever 306 is moved upwardly from the position illustrated in Fig. 3, the retaining arm 312 moves until the pin 318 is engaged by the recess 316 adjacent the end of the arm 312. At the same time, the abutment or pin 310 moves about the pivot pin or shaft 318 and by pressing against the adjacent edge of the carbon paper drive assembly mounting bracket 248, moves the entire carbon paper assembly mounting bracket 248 about the mounting shaft 252. The movement of the carbon paper drive assembly mounting bracket 248 results in disengaging the gear 274 on the carbon paper winding reel 260 from the gear 276. The disengagement of the above gears renders the carbon paper drive assembly inoperative during the score paper rewind operation.

If it is desired to replace the carbon paper after use, i. e., the carbon paper unwinding reel 258 being empty and the carbon paper winding reel 260 being full, it is necessary to move the disengaging lever 306 upwardly so as to disengage the retaining arm 312 completely from the pin 318. When the retaining arm 312 is disengaged completely from the retaining pin 318, the carbon paper assembly mounting bracket 278 may be manually pivoted about the mounting shaft 252 and brought to a position where the retaining arms 262 and 268 may be manually moved out of engagement with the shafts 266 and 272 of the reels 258 and 260. When the retaining arms 262 and 268 are disengaged from the shafts 266 and 272, the reels may be removed from the mounting notches 254 and 256 and fresh reels replaced therein.

(2) PRINTING ASSEMBLY

Included as an integral component of the presently preferred embodiment of the music recording device is a printing assembly for printing musical note indicia and time signature indicia on the advancing score paper in accordance with the musical composition to be played. The printing assembly is generally located in the area designated C in Fig. 1. The printing assembly incorporated in the device may be generally described as a plurality of magnetically actuated printing styluses positioned in a predetermined array with respect to the score paper 92 and adapted to compressively engage said carbon paper 242 and said score paper 92 adjacent the platen 292 as illustrated in Fig. 10.

Referring to Fig. 10, there is provided a platen 292 of a length preferably equivalent to the width of the score paper 92, positioned adjacent the path of the score paper 92 between the sprocketed idler roller 216 and the idler roller 220. As described above, the carbon paper 246 travels adjacent to and substantially parallel with the score paper 92 as guided by the carbon paper idler rollers 288 and 290. The carbon paper 246 is positioned so that the transfer surface thereof is placed adjacent to the surface of the score paper 92 upon which the indicia is to be printed.

There is provided a note printing magnet and stylus for each of the keys of the musical instrument to which the musical recording device is adapted to be connected. In the instance of a piano, therefore, 88 note printing magnets, i. e., one for each of the piano keys, are provided. Supplementing the note printing magnets and styluses there is also provided a suitable number, for example, 15, of time signature indicia, or beat-bar printing magnets and styluses, to print the time signature indicia on the score paper 92. In the presently preferred embodiment of the invention, the printing magnets, both note printing and beat-bar printing, are disposed in banks of five, as illustrated in Fig. 10. The arrangement illustrated in Fig. 10 is for one bank of magnets, and it should be kept clearly in mind that other banks of similarly positioned magnets are disposed parallel to the bank there illustrated.

If the music recording device is to be utilized in conjunction with another type of musical instrument other than a piano, a rearrangement of the number and positional relationship of the printing magnets may be required.

The printing magnets, both note printing and bar-beat printing, utilized in the preferred embodiment of the invention as illustrated in the drawings are similar in construction and, for the purposes of simplicity, the construction of one of the magnets will be described in detail with the understanding that such a description will be applicable to the remainder of the magnets. Each of the printing magnets 336 is mounted in a printing magnet supporting bracket 330 to which a magnet terminal bar 332 is fastened. The terminal bar 332 carries the terminal screws 334 to which the magnet leads are soldered. Each of the magnet supporting brackets 330, supporting a plurality of printing magnets 336, is mounted on and extends between the carbon paper drive assembly mounting brackets 248. The location of said bracket 330 with respect to the mounting brackets 248 determines the positional relationship of the plurality of magnets supported thereon. Pivotally secured to each of the supporting brackets 330 and positioned so as to be responsive to the energization of the printing magnet 336 is an armature 338. The free end of the armature 338 is positioned in operative relationship with an extended arm 340 of a stylus 342 pivoted about the stylus mounting arm 344.

Energization of the magnet 336 results in a movement of the armature 338 towards the printing magnet 336. The movement of the armature 338 displaces the extended arm 340 of the stylus 342. The displacement of the extended arm 340 causes the stylus 342 to pivot about the stylus mounting arm 344 and moves the printing tip 346 of the stylus 342 into printing engagement with the surface of the carbon paper 246. The pressure of the printing tip 346 of the stylus 342 on the surface on the carbon paper 246 results in a transfer of the transfer material on the transfer surface of the carbon paper to the surface of the score paper 92. The printing efficiency of the system is aided by the fact that the rate of advance of the score paper 92 past the platen 292 is different from the rate of advance of the carbon paper 246 past said platen 292. The differential in the rates of advance of the score paper 92 and the carbon paper 246 results in an effective scrubbing action beneath the surface of the stylus printing tip 346 when said tip 346 is placed in printing engagement with the surface of the carbon paper 246.

The stylus mounting arm 344 is secured to the stylus supporting member 348 which is mounted between and supported by the carbon paper drive assembly mounting brackets 248. When the printing magnet 336 is deenergized, the armature 338 is free to move and is returned to its non-printing position by the action of the stylus spring 350 connected between the stylus 342 and the stylus spring mounting bracket 352 mounted on the stylus supporting member 348.

The construction of one of the printing magnets and its associated printing stylus has been described in detail. The remainder of the printing magnets in the bank of five illustrated in Fig. 10 are of similar construction as that described above. The only difference in the remainder of the printing system therein illustrated from the unit described above, is the fact that the extended arms of each of the styluses associated with each of the printing magnets and corresponding in function to the arm 340 of the stylus 342 are shaped and positioned so as to be responsive to the displacement of armatures of the remainder of the printing magnets.

The score paper 92 is preferably of the type that has conventional musical staff lines preprinted thereon. The printing magnets and the styluses associated individually therewith are positioned so that the printing tip of each of the styluses is adapted to contact the portion of the score paper corresponding to the note value represented by each of said styluses. For example, the stylus representing the note value of middle C is located so as to contact the portion of the staff preprinted on the score paper representing the note value of middle C.

The energization of the note printing magnets is controlled by the keys of the musical instrument to which the music recording device is adapted to be connected. The electrical circuits for the energization of the note printing magnets, in response to the period of depression of the keys of the musical instrument are illustrated in Fig. 15. The individual note printing magnets, such as, for example, the magnet 336, are individually connected in series with a suitable switch, such as 354, across the A. C. source 200*a*. The switch 354 is positioned beneath the keys of a musical instrument and is adapted to be closed by the depression of the key, such as, for example, the piano key 355. When the switch 354 is closed by the depression of the key 355, a circuit is completed through the note printing magnet 336 and said magnet is energized. The energization of said magnet results in actuation of the printing stylus such as the stylus 342 illustrated in Fig. 10. The stylus 342 will be maintained in compressive engagement with the surface of the carbon paper 246 for a period of time determined by the period of depression of the key 355. Consequently, as a result of the movement of the score paper 92 and the carbon paper 246 past the platen 292, there will appear on the score paper 92 a line whose length is determined by the period of depression of the key 355. Thus, the positional relationship of the line on the score paper 92 with respect to the preprinted staff indicia reveals the musical note represented by the key 355 and the length of line on the score paper represents the duration of said musical note. To differentiate the natural notes, i. e., those represented by the white keys on the piano, from the sharps and flats, i. e., those represented by the black keys on the piano, the width of printing tips of the styluses representing the natural notes will be narrower than the printing tips of the styluses representing the sharp or flat notes. This will result in a line of one width being printed on the score paper to indicate the natural notes and a slightly wider line being printed to represent the sharps and flats. In either instance, however, the duration of the musical notes is determined by the length of line appearing on the score paper 92.

Included in the printing assembly together with the note printing magnets are a plurality of time signature indicia printing magnets or bar-beat printing magnets. The bar-beat printing magnets are similar in construction to the note printing magnets described above. The bar-beat printing magnets and their associated bar-beat printing styluses are positioned so as to provide a plurality of aligned regularly spaced vertical dashes on the advancing score paper. This is accomplished by having the printing tips of the bar-beat styluses wider than the tips of the note printing styluses.

The electrical and mechanical system for the energization of the bar-beat printing magnets for the printing of time signature indicia on the advancing score paper in accordance with the time signature of the composition to be played will be described in detail in the following portion of this specification.

(3) TIME SIGNATURE PRINTING ASSEMBLY

The above described construction of the score paper drive unit and the provision included therein for varying the rate of score paper advance in accordance with the tempo of the composition to be played, results in the length of line being recorded on the score paper for a specific note value, for example, a 1/4 note, being the same for fast or slow playing. To facilitate the interpretation of the lines representing the note values, a time signature printing assembly for printing measure, or bar and beat indicia on the advancing score paper in accordance with the time signature of the composition to be played, is provided as an integral component of the music recording device. The time signature printing assembly prints uniform bar and beat indicia on the advancing score paper irrespective of the tempo at which the composition is being played. Thus, irrespective of the tempo of the composition, the score sheet will travel the same distance per bar even though the time required for the score sheet to advance a distance represented by the bar length varies according to the tempo of the composition. The time signature printing assembly included in the device will space the bar and beat lines uniformly for any given time signature irrespective of whether the score paper is advancing at a rapid rate or at a relatively slow rate in accordance with the tempo of the composition being played.

The presently preferred embodiment of the time signature printing assembly may be generally described as a cam controlled electrical contact system for energization of the bar-beat printing magnets described above in relation to the printing asembly. There are provided a plurality of particularly shaped cams adapted to control the opening and closing of electric contact means included in the electric circuits for the bar-beat printing magnets. Suitable switching means are provided to selectively connect the cam system and associated electrical control circuit relating to the particular time signature of the composition to be played into operative relationship with the bar-beat printing magnet energization circuits. A pair of bar-beat cams, i. e., one cam for bar printing and an associated cam for beat printing, is provided for each of a predetermined number of conventional and commonly used time signatures.

The electrical circuits of the time signature printing assembly are illustrated in Fig. 15. The bar-beat printing magnets, represented by the magnets 356, are connected in parallel between the A. C. line 357 and the cam actuated time signature control circuit network generally designated E. The time signature control circuit network E includes a plurality of cam controlled time signature switching circuits connected in parallel between the A. C. line 358 and the bar-beat printing magnets 356. For the purposes of simplicity and brevity, one of the time signature switching circuits in the time signature control circuit network E will be examined in detail with the understanding that each of the remaining time signature switching circuits function in a similar manner but with differing time relationships determined by the shape and speed of rotation of the various bar-beat cams. Connected between the A. C. line 358 and the time signature control network E is the control network operating switch 359. Closure of this switch results in the application of power to the common line 360. If the time signature of the composition to be played is, for example, 3/2 time, the 3/2 time signature circuit switches 361 and 362 are closed. These switches may be connected to a single switch actuating arm, if desired, and may be closed simultaneously by the manual depression of said arm. After the switches 361 and 362 are closed, these switches and the corresponding switches in the other time signature circuits in the control network normally being open, rotation of the single lobe bar cam 402 and rotation of the multi-lobed beat cam 404 at predetermined rates, which will be described at a later point, will result in the intermittent making and breaking of the electrical contacts 363 and 364. The closure of the contacts 363 will be in response to the single lobe on the surface of the bar cam 402. The closure of the contacts 364 will be in response to the multiple lobes on the beat cam 404. When the contacts 363 are closed, current will flow through the control network operating switch 359, through the 3/2 time signature circuit 361, through the contacts 363, through the 3/2 time signature circuit switch 362, through the common line 365, through the blocking rectifier 366, and through the bar-beat printing magnets 356. The flow of current through the bar-beat printing magnets 356 will energize said magnets and place the bar-beat printing styluses in printing engagement with the carbon paper 246. The time duration of the period of energization of the bar-beat printing magnets 356 is determined by the time duration of the period of closure of the contacts 363 which is, in turn, determined by the shape of the lobe appearing on the bar cam 402 and the speed of rotation of said bar cam 402. When the bar cam 402 closes the contacts 363, current also flows through the bar indicia indicating light 367 connected in parallel with the bar-beat printing magnets 356 between the common line 365 and the A. C. line 357. The flow of current through the bar indicating light 367 illuminates said light and provides a simultaneous visual indication of the printed bar indicia to the person using the music recording device.

The beat contacts 364 will be intermittently closed in response to the lobes on the multi-lobed beat cam 404. Closure of the contacts 364 results in a flow of current through the control network operating switch 359, through the switch 361, through the contacts 364, through the common beat line 368, and through the bar-beat printing magnets 356. The flow of current through the bar-beat magnets 356 energizes said magnets and places the styluses associated therewith into printing engagement with the surface of the carbon paper 246. The flow of current through the common beat line 368 results in a flow of current through the beat indicating light 369 which provides a visual indication of the beat indicia to the user of the music recording device. To provide for a visual differentiation of bar and beat lines printed on the score paper 92, the lobe on the bar cam 402 may be shaped to maintain the contacts 363 closed for a relatively long period of time, thus maintaining the bar-beat printing magnets 356 energized for said period of time, which in turn maintains the bar-beat styluses in printing engagement with the surface of the carbon paper 246 for said period and prints a relatively thick or heavy line. In contradistinction, the lobes on the beat cam 404 may be shaped to maintain the contacts 364 closed for a much shorter period of time, which in turn results in the printing of a relatively narrow line for the beat indicia. It should be noted at this time that the flow of current through the beat indicating light 369 does not affect the bar indicating light 367 due to the presence in the circuit of the blocking rectifier 366 which passes current only in the direction indicated by the arrow on the drawings.

Figures 11, 12, 13:
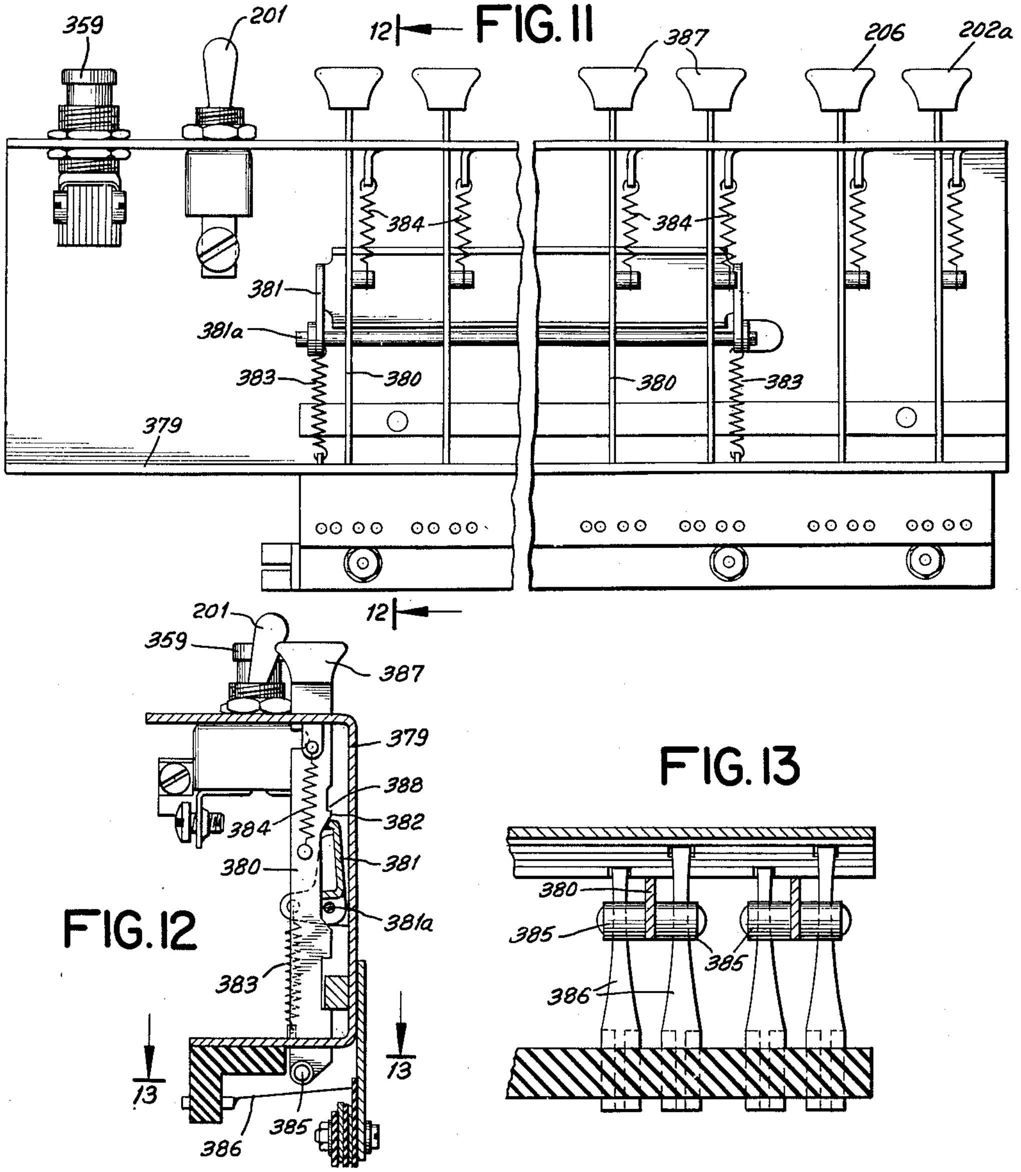
Fig. 11 is an elevation illustrating the control unit for the time signature switching assembly.
Fig. 12 is a section on the line 12—12 of Fig. 11.
Fig. 13 is a section on the line 13—13 of Fig. 12.

The remaining individual time signature control circuits of the time signature control network, connected in parallel with the 3/2 time signature circuit described above and representing other predetermined time signatures as illustrated in Fig. 11, function in an identical manner as that of the curcuit described above. The remaining circuits are also similarly constructed except for the shapes and speeds of rotation of the individual bar-beat cams.

To prevent the utilization of more than one time signature control circuit in the network at any one time, the 3/2 time signature circuit switches 361 and 362 and the corresponding time signature circuit switches in the other time signature control circuits may be so constructed that closure of one set automatically clears the switch deck and opens all the other switches. This will assure that only one time signature indicia may be printed at a single time.

Figure 14:
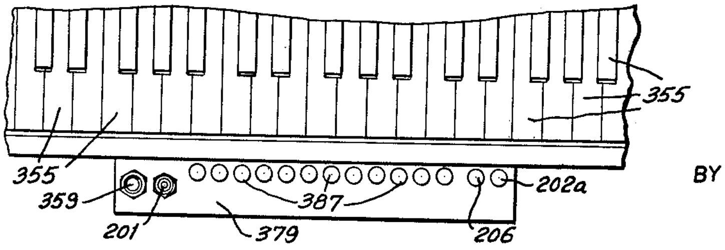
Fig. 14 is a side elevation of the mounting of the control unit of Fig. 11 on a piano keyboard.

Figs. 11 through 13 illustrate a presently preferred embodiment of the switching control unit for the circuits illustrated in Fig. 15. Fig. 14 shows the mounting of the control unit on a piano keyboard. The control unit comprises a casing 379 having a plurality of switch control bars, such as 380, slidably supported therein for movement in a vertical direction. Extending horizontally within the casing is a bail 381 pivotally supported at 381*a* and having a hooked upper portion engageable with cam surfaces 382 on the edge of the control bars 380. Springs 383 yieldingly urge the bail 381 into engagement with the cam surfaces 382 and springs 384 normally hold each of the control bars 380 in its upper position. Projecting from each of the control bars 380 at their lower ends are studs 385 which are engageable with spring contact elements 386 upon downward movement of the control bars 380. As indicated in Figs. 12 and 13, two studs 385 project from each of the bars 380 in opposite directions for engaging separate contact elements 386. At the upper end of each control bar 380 is a key 387, provided with suitable identifying indicia, permitting manual operation of each bar downwardly against the action of the springs 384. Downward movement of a control bar 380 effects a swinging of the bail 381 in a clockwise direction until, upon movement of the bar to its contact closing position, the bail 381 hooks over a shoulder 388 upon the upper end of the cam surface 382. It will be appreciated that the depressed control bar 380 will be latched in its lower position to maintain its contacts closed until another key 387 is depressed. Upon depression of another key 387 the bail 381 is then rocked to effect unlatching of any bar previously latched in depressed position and a latching of the last operated control bar 380 in its lower or depressed position.

In the control unit illustrated in Fig. 11, eleven keys 387 are provided to control the bars of the switches for the time signature control network illustrated in Fig. 15, the switches there identified being the spring contact members 386 in the drawings above referred to. To centralize the controls for the entire unit, the two keys at the right hand end of the control unit illustrated in Fig. 11 are utilized to control the energization of the clutching magnets for effecting an increase or decrease in the rate of score paper advance. These switches have been identified as switches 206 and 202*a* to correspond with the similarly numbered switches on Fig. 15. At the left hand end of the assembly are the switches 201 and 359 which correspond to similarly numbered switches of Fig. 15.

Fig. 14 illustrates a convenient mounting of the above described unit on the edge of a piano keyboard.

Figure 9:
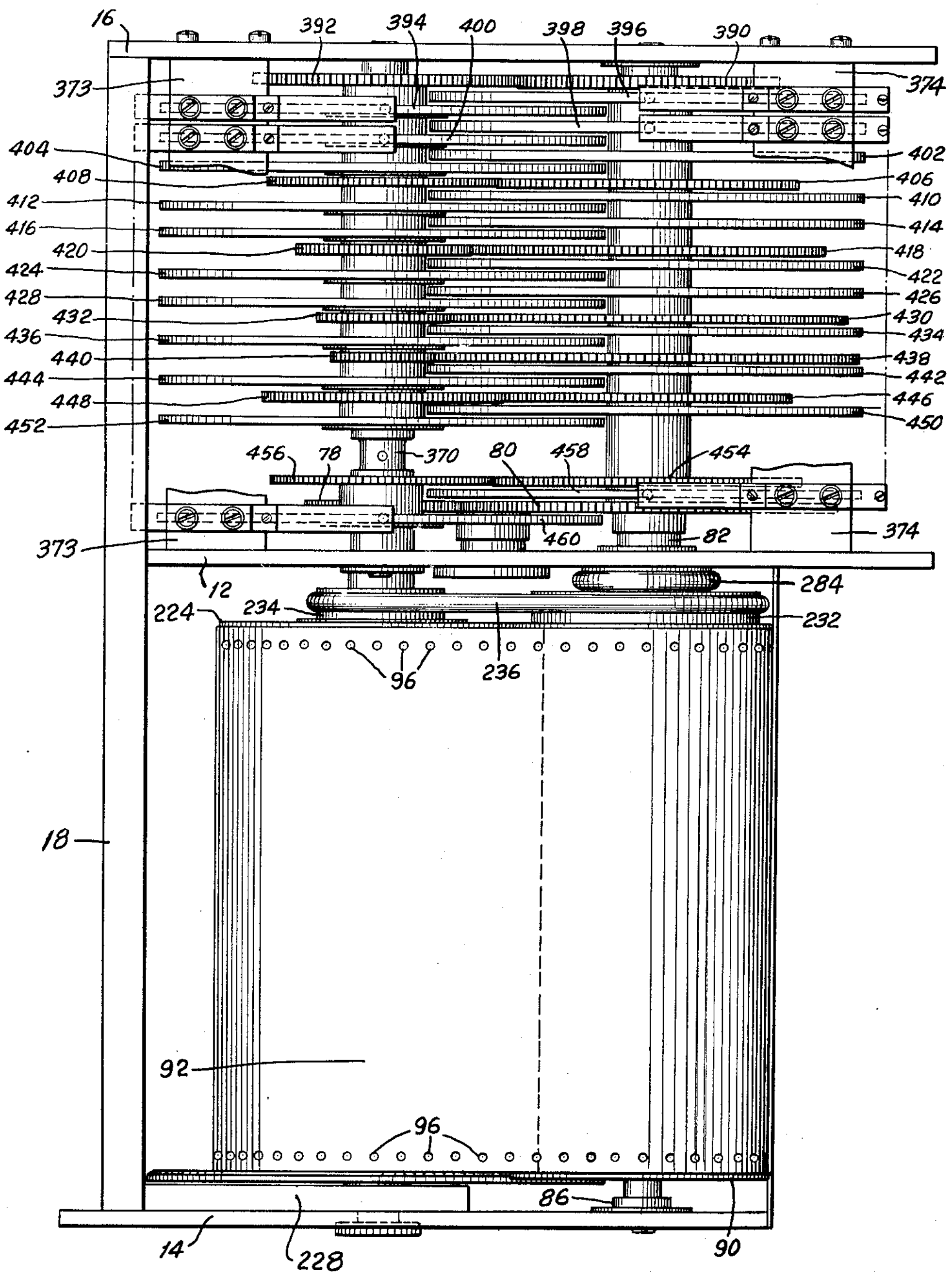
Fig. 9 is a side elevation on the line 9—9 of Fig. 2.

The mechanical structure of the bar-beat cam system in the time signature printing assembly is illustrated in Figs. 1, 2 and 9. The bar-beat cam system in the time signature printing assembly may generally be described as including a common bar cam shaft upon which the individual bars cams related to each of the predetermined time signatures are mounted. Associated with the bar cam shaft in the bar-beat cam system is an adjacent beat cam shaft upon which the individual multi-lobed beat cams related to each of the particular predetermined time signatures are rotatably mounted. As the time signature of the composition to be played defines the number of beats in a measure or bar and also defines the type of note comprising a beat, the number of lobes of the multi-lobed beat cam and its rate of rotation relative to that of its accompanying single lobed bar cam determines the spacing of the bar and beat indicia on the advancing score paper.

At an earlier point in this specification, the details of the drive unit, generally designated A on Fig. 1, were described. Included in the drive unit was a driving disc 54 which was geared to a shaft 82 by the gears 78 and 80 (see Fig. 1). Mounted on the shaft 82 and positioned between the intermediate horizontal platform 12 and the lower horizontal platform 14 was the score paper drive drum 90 which provided a positive drive for the score paper 92 in accordance with the rate of rotation of the drive disc 54. The bar-beat cam system of the time signature printing assembly is generally located between the intermediate horizontal platform 12 and the upper horizontal platform 16. The portion of the shaft 82 positioned between the intermediate horizontal platform 12 and the upper horizontal platform 16 has mounted thereon a plurality of single lobed bar cams, each corresponding to a determined time signature, and may be designated as the bar cam shaft. The bar cams are closely and adjacently mounted on the shaft 82 and rotate in conjunction therewith.

Each of the bar cams mounted on the bar cam shaft 82 has an associated beat cam rotatably mounted on an adjacent beat cam shaft 370. As the spacing of the printed bar-beat indicia on the advancing score paper is determined by the number of lobes on the beat cam and its speed of rotation relative to the speed of rotation of its corresponding bar cam, each of the beat cams is mechanically linked, as by the gears 390, 392 to its associated bar cam. Thus, rotation of the bar cam shaft 82 results in rotation of each of the bar cams at a rate in accordance with the rate of advance of the score paper 92. The speed of rotation of the beat cams is determined by the gear ratio of the mechanical gearing such as that illustrated by the gears 390 and 392. Suitably positioned adjacent the surfaces of each of the bar and beat cams and in operative relationship therewith are suitable electrical contacts such as the contacts 371 and 372 illustrated in Fig. 2 which are mounted on suitable support members, such as 373, 374 (see Fig. 9). The electrical contacts 371 and 372 and the remaining contacts, not shown, are adapted to be closed by the lobes appearing on the surface of the bar and beat cams. Included in each of the electrical contacts are suitable spring members to open the contacts after the lobes have passed the operating position.

The following example will serve to illustrate the operation and time relationships included in the presently preferred embodiment of the time signature printing assembly. If the time signature of the composition to be played is defined as ¾ time, the single lobe bar cam 422 (see Fig. 9) mounted on the bar cam shaft 82 is utilized and the ¾ time signature control circuit is rendered effective by closure of the ¾ time signature control circuit switches 375, 376 (see Fig. 15). The bar cam 422 rotates in conjunction with the bar cam shaft 82 and its speed of rotation is thus directly linked to the rate of advance of the score paper 92. Rotation of the bar cam 422 will alternately make and break the contacts 377 (see Fig. 15), in the electric circuit for the bar-beat printing magnets 356 and will result in repeated printing of the bar line on the score paper in accordance with the rate of rotation of said cam 422. Since the rate of rotation of the bar cam 422 is always in accordance with the rate of advance of the score paper 92, the spacing of the printed bar lines thereon will be the same irrespective of the tempo at which the composition is being played.

Mounted adjacent the single lobed bar cam 422 and rotating therewith is the ¾ time bar cam gear 418. The bar cam gear 418 meshes with and rotates the ¾ time beat cam gear 420, which is rotatably mounted on the beat cam shaft 370. Rotatably mounted on the beat cam shaft 370 and turning with the beat cam gear 420 is the multi-lobed ¾ time beat cam 424. The ¾ time beat cam 424 is provided with six lobes. However, since ¾ time defines a measure as including three beats, it is necessary to print two intermediate beat lines between two successive bar lines. The six-lobed ¾ time beat cam 424 will energize the printing magnets whenever any of the lobes thereon close the electrical contacts 378 (see Fig. 15) associated therewith. To provide the proper relationship between the number of printed beat lines and bar lines, the gears 418 and 420 are suitably constructed so as to rotate the beat cam through a ½ revolution for each complete revolution of the bar cam 422. Thus, since the ¾ time beat cam 424 rotates ½ a revolution for each complete revolution of the bar cam 422, only three of the six lobes available thereon will actuate the printing magnet during one revolution of the bar cam 422.

To simplify the construction of the time signature printing assembly and to conserve space, a single set of gears such as that described above may be utilized to drive several beat cams when a numerical relationship may be established between the number of lobes required and the speed of rotation. This is illustrated in the drawings by the fact that the ⁶/₈ time beat cam 428 rotates in conjunction with and at the same rate as the ¾ time beat cam 424 under the driving effect of the gears 418 and 420, however, said cam 428 has four lobes as compared with the six-lobed ¾ time beat cam 424.

The following table sets forth the constructional details and the relative rates of rotation of the various cam and gear assemblies included in the presently preferred embodiment of the invention for the illustrated time signatures.

| Time Signature | Bar Cam No. | No. of Lobes on Bar Cam | Beat Cam No. | No. of Lobes on Beat Cam | Bar Cam Gear No. | Beat Cam Gear No. | Turn Ratio Beat Cam: Bar Cam |
|---|---|---|---|---|---|---|---|
| 12/8 | 396 | 1 | 394 | 4 | 390 | 392 | 1:1 |
| 6/4 | 398 | 1 | 400 | 6 | 390 | 392 | 1:1 |
| 3/2 | 402 | 1 | 404 | 3 | 390 | 392 | 1:1 |
| 4/4 | 410 | 1 | 412 | 6 | 406 | 408 | 2/3:1 |
| 2/2 | 414 | 1 | 416 | 3 | 406 | 408 | 2/3:1 |
| 3/4 | 422 | 1 | 424 | 6 | 418 | 420 | 1/2:1 |
| 6/8 | 426 | 1 | 428 | 4 | 418 | 420 | 1/2:1 |
| 2/4 | 434 | 1 | 436 | 6 | 430 | 432 | 1/3:1 |
| 3/8 | 442 | 1 | 444 | 12 | 438 | 440 | 1/4:1 |
| 5/4 | 450 | 1 | 452 | 6 | 446 | 448 | 5/6:1 |
| 9/8 | 458 | 1 | 460 | 4 | 454 | 456 | 3/4:1 |

Construction in accordance with the above table will result in the printing of correctly spaced bar and beat indicia in accordance with the listed time signatures. It will be understood that similar arrangements may be provided for other time signatures not set forth above.

Having thus described our invention, we claim:

1. Apparatus for recording musical compositions played on a keyboard instrument, comprising, means for advancing score paper past a printing station at a rate variable in accordance with the tempo of the composition to be played, means directly driven by said score paper advancing means and responsive to the rate of advance of the score paper for printing uniform measure and beat indicia on said score paper, said measure and beat indicia having a given spacing in accordance with the time signature of the composition to be played irrespective of the tempo of the composition to be played, and means responsive to the period of depression of the keys of said keyboard instrument for printing musical note indicia of said advancing score paper said note indicia having uniform characteristics irrespective of the tempo of the composition to be played.

2. Apparatus for recording musical compositions played on a keyboard instrument, comprising, printing means, means for advancing score paper past the printing means at a rate variable in accordance with the tempo of the composition to be played, means directly responsive to the rate of advance of the score paper and associated with said printing means for printing uniform measure and beat indicia on said advancing score paper, said measure and beat indicia having a given spacing in accordance with the time signature of the composition to be played irrespective of the tempo of the composition to be played and means responsive to the period of depression of the keys of said instrument and associated with said printing means for printing musical note indicia on said advancing score paper said note indicia having uniform characteristics irrespective of the tempo of the composition to be played.

3. Apparatus for recording musical compositions played on a keyboard instrument, comprising, means for advancing score paper past a printing station at a rate variable in accordance with the tempo of the composition to be played, a plurality of electrically actuated printing elements positioned in a predetermined array with respect to said advancing score paper, means directly responsive to the rate of advance of said score paper for actuating selected elements of said plurality of printing elements for printing uniform measure and beat indicia on said score paper, said measure and beat indicia having a given spacing in accordance with the time signature of the composition to be played irrespective of the tempo of the composition to be played, and electric circuit means responsive to the period of depression of the keys of said instrument for actuating selected elements of said plurality of printing elements for printing musical note indicia on said advancing score paper said note indicia having uniform characteristics irrespective of the tempo of the composition to be played.

4. In apparatus for recording musical compositions on a strip of advancing score paper, a time signature printing assembly, comprising, a plurality of electrically actuated printing elements, a plurality of electrical circuits selectively adapted for individual connection with said printing elements, electrical contact means included in each of said electrical circuits, rotatable cam means directly controlled by the rate of advance of said advancing score paper for actuating said electrical contact means, and switching means for effecting the selected connection of said electrical circuit means in accordance with the time signature of the musical composition to be recorded, whereby the time signature indicia is of uniform characteristic irrespective of the tempo of the composition to be played.

5. In apparatus for recording musical compositions on a strip of advancing score paper, in combination, a plurality of electrically actuated printing elements, a plurality of electrical circuits selectively adapted for individual connection with said printing elements for printing measure indicia on the advancing score paper, electrical contact means included in each of said measure printing circuits, a measure cam rotated at a rate in direct accordance with the rate of advance of the score paper for actuating said electrical contact means in each of said measure printing circuits, a plurality of electrical circuits selectively adapted for individual connection with said printing elements for printing beat indicia on the advancing score paper, electrical contact means included in each of said beat printing circuits, a beat cam shaped in accordance with the time signature of a composition to be played and driven by its associated measure cam for actuating said electrical contact means in each of said beat printing circuits, and switching means for effecting the selected connection of said measure printing and beat printing electric circuits in accordance with the time signature of the composition to be recorded, whereby the time signature indicia is of uniform characteristic irrespective of the tempo of the composition to be played.

6. Apparatus for recording musical compositions played on a keyboard instrument, comprising, means for advancing score paper past a printing station at a rate in accordance with the tempo of the composition to be played, means directly responsive to the rate of advance of the score paper for printing uniform measure and beat indicia thereon, said measure and beat indicia having a given spacing in accordance with the time signature of the composition to be played, including, a plurality of electrically actuated printing elements, a plurality of electrical circuits selectively adapted for individual connection with said printing elements, electrical contact means included in each of said electrical circuits, rotatable cam means associated with said advancing score paper and driven at a rate in accordance with the rate of advance of said score paper for actuating said electrical contact means, and switching means for effecting the selected connection of said electrical circuit means in accordance with the time signature of the musical composition to be recorded; and means responsive to the period of depression of the keys of said keyboard instrument for printing musical note indicia on said advancing score paper said note indicia having uniform characteristics irrespective of the tempo of the composition to be played.

7. Apparatus for recording musical compositions played on a keyboard instrument, comprising, means for advancing score paper past a printing station at a rate in accordance with the tempo of the composition to be played, a plurality of electrically actuated printing elements, a plurality of electrical circuits selectively adapted for individual connection with said printing elements for printing measure indicia on the advancing score paper, electrical contact means included in each of said measure printing circuits, a measure cam rotated at a rate in direct accordance with the rate of advance of the score paper for actuating said electrical contact means in each of said measure printing circuits, a plurality of electrical circuits selectively adapted for individual connection with said printing elements for printing beat indicia on the advancing score paper, electrical contact means included in each of said beat printing circuits, a beat cam shaped in accordance with the time signature of a composition to be played and driven by its associated measure cam for actuating said electrical contact means in each of said beat printing circuits, and switching means for effecting the selected connection of said measure printing and beat printing electric circuits in accordance with the time signature of the composition to be recorded; and means responsive to the period of depression of the keys of said keyboard instrument for printing musical note indicia on said advancing score paper said note indicia having uniform characteristics irrespective of the tempo of the composition to be played.

8. Apparatus for recording musical compositions played on a keyboard instrument, comprising, a drive assembly for advancing score paper past a printing station at a rate in accordance with the tempo of the composition to be played, comprising, a driving member, a drive shaft driven by said driving member, a threaded auxiliary shaft disposed substantially parallel to said drive shaft, a wheel slidably mounted on and turned by said main drive shaft; means to move said wheel axially along said drive shaft, including, a carriage threadedly mounted on said auxiliary shaft and connected to the mount for said wheel, power take-off means associated with said shafts for drivingly connecting said drive shaft to said auxiliary shaft, and electrically actuated clutching means for placing said power take-off means in operative relationship with said drive shaft, whereby rotation of said auxiliary shaft moves said carriage longitudinally thereon; a driving disc frictionally engaged by the periphery of said wheel and rotated thereby, the rate of rotation of said disc being determined by the radial distance between the center of disc and the point of engagement thereon with said wheel, and a score paper drive drum driven at a rate in direct accordance with the rate of rotation of said driving disc; means responsive to the rate of advance of the score paper for printing uniform measure and beat indicia on said score paper, said measure and beat indicia having a given spacing in accordance with the time signature of the composition to be played, including, a plurality of electrically actuated printing elements, a plurality of electrical circuits selectively adapted for individual connection with said printing elements, electrical contact means included in each of said electrical circuits, rotatable cam means associated with and driven at a rate in direct accordance with the rate of advance of said advancing score paper for actuating said electrical contact means, and switching means for effecting the selected connection of said electrical circuit means in accordance with the time signature of the musical composition to be recorded; and means responsive to the period of depression of the keys of said keyboard instrument for printing musical note indicia on said advancing score paper said note indicia having uniform characteristics irrespective of the tempo of the composition to be played.

9. Apparatus for recording musical compositions played on a keyboard instrument, comprising, a drive assembly for advancing score paper past a printing station at a rate in accordance with the tempo of the composition to be played, including, a driving member, a drive shaft driven by said driving member, a wheel mounted on and turned by said shaft, a driving disc frictionally engaged by the periphery of said wheel and rotated thereby, means for moving the wheel axially along said drive shaft so as to vary the radial distance between the center of said driving disc and the point of engagement thereon with said wheel, a score paper drive assembly driven at a rate in direct accordance with the rate of rotation of said driving disc for advancing score paper past a printing station; means responsive to the rate of advance of the score paper for printing uniform measure and beat indicia thereon, said measure and beat indicia having a given spacing in accordance with the time signature of the composition to be played, including, a plurality of electrically actuated printing elements, a plurality of electrical circuits selectively adapted for individual connection with said printing elements, electrical contact means included in each of said electrical circuits, rotatable cam means associated with and driven at a rate in direct accordance with the rate of advance of said advancing score paper for actuating said electrical contact means, and switching means for effecting the selected connection of said electrical circuit means in accordance with the time signature of the musical composition to be recorded; and means responsive to the period of depression of the keys of said keyboard instrument for printing musical note indicia on said advancing score paper said note indicia having uniform characteristics irrespective of the tempo of the composition to be played.

10. Apparatus for recording musical compositions played on a keyboard instrument, comprising, a drive assembly for advancing score paper past a printing station at a rate in accordance with the tempo of the composition to be played, comprising, a driving member, a drive shaft driven by said driving member, a threaded auxiliary shaft disposed substantially parallel to said drive shaft, a wheel slidably mounted on and turned by said main drive shaft; means to move said wheel axially along said drive shaft, including, a carriage threadedly mounted on said auxiliary shaft and connected to the mount for said wheel, power take-off means associated with said shafts for drivingly connecting said drive shaft to said auxiliary shaft, and electrically actuated clutching means for placing said power take-off means in operative relationship with said drive shaft, whereby rotation of said auxiliary shaft moves said carriage longitudinally thereon; a driving disc frictionally engaged by the periphery of said wheel and rotated thereby, the rate of rotation of said disc being determined by the radial distance between the center of disc and the point of engagement thereon with said wheel, and a score paper drive drum driven at a rate in direct accordance with the rate of rotation of said driving disc; means responsive to the rate of advance of the score paper for printing uniform measure and beat indicia on said score paper in accordance with the time signature of the composition to be played, including, a plurality of electrically actuated printing elements, a plurality of electrical circuits selectively adapted for individual connection with said printing elements for printing measure indicia on the advancing score paper, electrical contact means included in each of said measure printing circuits, a measure cam rotated at a rate in direct accordance with the rate of advance of the score paper for actuating said electrical contact means in each of said measure printing circuits, a plurality of electrical circuits selectively adapted for individual connection with said printing elements for printing beat indicia on the advancing score paper, electrical contact means included in each of said beat printing circuits, a beat cam shaped in accordance with the time signature of a composition to be played and driven by its associated measure cam for actuating said electrical contact means in each of said beat printing circuits, and switching means for effecting the selecting connection of said measure printing and beat printing electric circuits in accordance with the time signature of the composition to be recorded; and means responsive to the period of depression of the keys of said keyboard instrument for printing musical note indicia on said advancing score paper said note indicia having uniform characteristics irrespective of the tempo of the composition to be played.

11. Apparatus for recording musical compositions played on a keyboard instrument, comprising, a drive assembly for advancing score paper past a printing station at a rate in accordance with the tempo of the composition to be played, including, a driving member, a drive shaft driven by said driving member; a wheel mounted on and turned by said shaft, a driving disc frictionally engaged by the periphery of said wheel and rotated thereby, means for moving the wheel axially along said drive shaft so as to vary the radial distance between the center of said driving disc and the point of engagement thereon with said wheel, a score paper drive assembly driven at a rate in direct accordance with the rate of rotation of said driving disc for advancing score paper past a printing station; means responsive to the rate of advance of the score paper for printing uniform measure and beat indicia thereon, said measure and beat indicia having a given spacing in accordance with the time signature of the composition to be played, including, a plurality of electrically actuated printing elements, a plurality of electrical circuits selectively adapted for individual connection with said printing elements for printing measure indicia on the advancing score paper, electrical contact means included in each of said measure printing circuits, a measure cam rotated at a rate in direct accordance with the rate of advance of the score paper for actuating said electrical contact means in each of said measure printing circuits, a plurality of electrical circuits selectively adapted for individual connection with said printing elements for printing beat indicia on the advancing score paper, electrical contact means included in each of said beat printing circuits, a beat cam shaped in accordance with the time signature of a composition to be played and driven by its associated measure cam for actuating said electrical contact means in each of said beat printing circuits, and switching means for effecting the selected connection of said measure printing and beat printing electric circuits in accordance with the time signature of the composition to be recorded; and means responsive to the period of depression of the keys of said keyboard instrument for printing musical note indicia on said advancing score paper said note indicia having uniform characteristics irrespective of the tempo of the composition to be played.

12. Apparatus for recording musical compositions played on a keyboard instrument, comprising, means for advancing score paper past a printing station at a rate variable in accordance with the tempo of the composition to be played, means driven by said score paper advancing means for advancing carbon paper past said printing station in transfer relationship with said score paper, gearing means included in said carbon paper advancing means for maintaining a predetermined differential between the rate of advance of the carbon paper and the rate of advance of the score paper past said printing station, a plurality of printing styluses positioned in a predetermined array at said printing station, an electrically actuated printing magnet associated with each of said styluses and adapted upon energization thereof to place its associated stylus in printing relationship with said carbon paper, means connected in circuit with said printing magnets and directly responsive to the rate of advance of said score paper for printing uniform measure and beat indicia thereon, said measure and beat indicia having a given spacing in accordance with the time signature of the composition to be played, and means responsive to the period of depression of the keys of said keyboard instrument and connected in circuit with said printing magnets for printing musical note indicia on said advancing score paper said note indicia having uniform characteristics irrespective of the tempo of the composition to be played.

13. Apparatus for recording musical compositions played on a keyed instrument, comprising, means for advancing score paper past a printing station, means included in said score paper advancing means for varying the rate of advance of said score paper in accordance with the tempo of the composition to be played, a plurality of electrically actuated printing elements positioned in a predetermined array with respect to said score paper at said printing station, a time signature printing assembly for printing uniform measure and beat indicia on said advancing score paper, said measure and beat indicia having a given spacing in accordance with the time signature of the composition to be played, including a plurality of cams having surface contours of a shape predetermined by the time signature of the composition to be played rotated at a rate in direct accordance with the rate of score paper advance, electrical contact means actuated by the surface contours of each of said cams, electric circuits adapted to connect each of said contact means with selected members of said plurality of electrically actuated printing elements, switching means included in each of said electric circuits for effecting the selected connection of said circuits in accordance with the time signature of the composition to be played; and means responsive to the period of depression of the keys of said musical instrument and associated with said plurality of printing elements for printing corresponding musical note indicia on said advancing score paper said note indicia having uniform characteristics irrespective of the tempo of the composition to be played.

14. Apparatus for recording musical compositions played on a keyboard instrument, comprising, score paper advancing means, including, a constant speed motor, a drive shaft driven by said constant speed motor, a wheel mounted on and turning with said drive shaft, a driving disc frictionally engaged and rotated by the periphery of said wheel, a score paper reel assembly driven by rotation of said driving disc for advancing score paper past a platen at a rate determined by the speed of rotation of said disc, means for moving the wheel longitudinally along said main drive shaft for varying the speed of rotation of said driving disc in accordance with the tempo of the composition to be played; a carbon paper drive assembly driven by rotation of said driving disc for advancing carbon paper past said platen in transfer relationship with said score paper, linkage means included in said carbon paper drive assembly for maintaining a predetermined differential between the rate of advance of said carbon paper and the rate of advance of said score paper past said platen, a plurality of printing styluses positioned adjacent said platen, an electrically actuated printing magnet for placing each of said styluses in printing relationship with the carbon paper; a time signature printing assembly for printing uniform measure and beat indicia on said advancing score paper, said measure and beat indicia having a given spacing in accordance with the time signature of the composition to be played, including, a plurality of single lobed bar cams rotated at a rate in direct accordance with the rate of score paper advance, a multi-lobed beat cam associated with each of said bar cams and shaped in accordance with the time signature requirements of compositions to be played, electrical contact means adapted to be actuated by each of said bar and beat cams, electrical circuits connecting said contact means with selected members of said plurality of printing magnets, and switching means for effecting the selected connection of said electric circuits in accordance with the time signature of the composition to be played; means included in said electrical circuits for providing visual indicia of said measure and beat indicia, and a note printing assembly actuated by and responsive to the period of depression of the keys of said keyboard instrument, including a key contact disposed beneath each of the keys of said keyboard instrument and adapted to be closed by the depression of said keys, and an electric circuit connecting each of said key contact means with a printing magnet so that the said note printing assembly will produce printed notes having uniform characteristics irrespective of the tempo of the composition to be played.

15. Apparatus for recording musical compositions played on a keyed instrument, comprising, means for advancing score paper past a printing station, means included in said score paper advancing means for varying the rate of advance of said score paper in accordance with the tempo of the composition to be played, a plurality of electrically actuated printing elements positioned in a predetermined array with respect to said score paper at said printing station, a time signature printing assembly for printing uniform measure and beat indicia on said advancing score paper, said measure and beat indicia having a given spacing in accordance with the time signature of the composition to be played, including, a plurality of bar cams mounted on a cam shaft rotated by said paper advancing means at a rate in direct accordance with the rate of advance of said score paper, a plurality of associated beat cams rotatably mounted on an independent shaft, gearing means associated with each of said bar cams and its associated beat cams for rotating said beat cams, each of said bar and beat cams having a surface contour shaped in accordance with time signature requirements, electric contact means associated with each of said beat and bar cams actuated by the surface contours of said cams, electric circuits adapted to connect each of said electric contact means in circuit with selected elements of said plurality of printing elements, switching means associated with said electric circuits for effecting the selected connection of said circuits in accordance with the time signature of the composition to be played, and means responsive to the period of depression of the keys of said instrument and associated with said remaining printing elements for printing corresponding musical note indicia on said advancing score paper, said note indicia having uniform characteristics irrespective of the tempo of the composition to be played.

References Cited in the file of this patent

UNITED STATES PATENTS

| | | |
|---|---|---|
| 549,057 | Cangello | Oct. 29, 1895 |
| 736,571 | Ball | Aug. 18, 1903 |
| 778,835 | Ball | Jan. 3, 1905 |
| 1,439,304 | Fraser | Dec. 19, 1922 |
| 1,847,282 | Underwood | Mar. 1, 1932 |
| 2,024,200 | Barsuk | Dec. 17, 1935 |
| 2,234,948 | Allen, Jr. et al. | Mar. 18, 1941 |
| 2,502,928 | Clark | Apr. 4, 1950 |
| 2,516,842 | Baker | Aug. 1, 1950 |
| 2,570,330 | Eglan | Oct. 9, 1951 |

FOREIGN PATENTS

| | | |
|---|---|---|
| 52,240 | Austria | Feb. 26, 1912 |
| 262,821 | Switzerland | Nov. 1, 1949 |